United States Patent
Tsutsui et al.

(10) Patent No.: US 7,266,700 B2
(45) Date of Patent: Sep. 4, 2007

(54) CODE-STRING ENCRYPTION METHOD AND APPARATUS, DECRYPTION METHOD AND APPARATUS, AND RECORDING MEDIUM

(75) Inventors: Kyoya Tsutsui, Kanagawa (JP); Naoya Haneda, Tokyo (JP)

(73) Assignee: Sony Corporation, Tokyo (JP)

(*) Notice: Subject to any disclaimer, the term of this patent is extended or adjusted under 35 U.S.C. 154(b) by 768 days.

(21) Appl. No.: 10/648,092

(22) Filed: Aug. 26, 2003

(65) Prior Publication Data
US 2004/0141612 A1 Jul. 22, 2004

(30) Foreign Application Priority Data
Aug. 28, 2002 (JP) .............................. 2002-249263

(51) Int. Cl.
*G06F 9/00* (2006.01)
(52) U.S. Cl. .................... 713/182; 713/165; 713/168; 713/171
(58) Field of Classification Search ................ 713/182, 713/165, 168, 171
See application file for complete search history.

(56) References Cited

U.S. PATENT DOCUMENTS

| | | | |
|---|---|---|---|
| 5,423,003 A * | 6/1995 | Berteau | ....................... 370/254 |
| 5,546,379 A * | 8/1996 | Thaweethai et al. | ........ 370/254 |
| 5,602,991 A * | 2/1997 | Berteau | ...................... 709/227 |
| 5,717,821 A | 2/1998 | Tsutsui et al. | |
| 6,081,784 A | 6/2000 | Tsutsui | |

FOREIGN PATENT DOCUMENTS

| | | |
|---|---|---|
| JP | 10-135944 | 5/1998 |
| JP | 2003-304158 | 10/2003 |
| JP | 2003-337599 | 11/2003 |
| WO | WO94/28633 | 6/2000 |
| WO | WO 02/065449 | 8/2002 |
| WO | WO 03/085836 | 10/2003 |

* cited by examiner

*Primary Examiner*—Thomas R. Peeso
(74) *Attorney, Agent, or Firm*—Finnegan, Henderson, Farabow, Garrett & Dunner, L.L.P.

(57) ABSTRACT

An original code string is decomposed into preview data (trial data) and high-quality data in a code-string decomposer. The high-quality data is separated into first data having an exactly or almost regular pattern and second data other than the first data by a high-quality data separator 1882. The second data is encrypted. The first data is not encrypted, or is encrypted by an encryption process other than that used for the second data. With this arrangement, important data is prevented from being deciphered.

21 Claims, 30 Drawing Sheets

CODE-STRING ENCRYPTION METHOD AND APPARATUS, DECRYPTION METHOD AND APPARATUS, AND RECORDING MEDIUM

BACKGROUND OF THE INVENTION

1. Field of the Invention

The present invention relates to a method for coding signals for allowing users to play back preview (trial) data, and for implementing high-quality recording/playback operations by adding a small amount of data if a user decides to purchase corresponding data.

2. Description of the Related Art

According to known software distribution methods, audio-visual data is broadcasted by encrypting corresponding signals, or data is recorded in recording media, and only users who have purchased a certain key are allowed to view or listen to the data. As an encryption method, the initial value of a random number sequence is given to a bit string of a pulse code modulation (PCM) audio signal as a key signal, and a bit string obtained by performing an exclusive OR of the generated 0/1 random number sequence and the above-described PCM bit string is transmitted or recorded in a recording medium. According to this method, only the users who have obtained the key signal are allowed to correctly play back the audio signal, and those who have not obtained the key signal are unable to play back the audio signal, and only noise is heard. A more complicated encryption method may be employed by using, for example, the Data Encryption Standard (DES).

Details of DES are described in Federal Information Processing Standards Publication 46, Specifications for the DATA ENCRYPTION STANDARD, Jan. 15, 1977.

Methods for compressing audio signals and then broadcasting corresponding data or recording the data in a recording medium are available. Accordingly, recording media, such as magneto-optical disks, are widely used for recording coded audio signals. There are various techniques for coding audio signals with high efficiency. For example, in a blockless frequency-band division technique, i.e., a so-called "sub-band coding (SBC)", an audio signal in the time domain is divided into a plurality of frequency bands and coded without dividing them into blocks. In a block frequency-band division technique, i.e., a so-called "transform coding", a signal in the time domain is transformed (spectrum transform) into a signal in a frequency domain so as to be divided into a plurality of frequency bands. The signal components are then coded in each band. Another high-efficiency coding technique, which is a combination of the above-described sub-band coding and transform coding, has also been considered. In this case, for example, after sub-band division is performed in the above-described SBC, signal components in each sub band are transformed into signal components in the frequency domain, and are then coded in each band.

Filters used in the above-described high-efficiency coding methods include quadrature mirror filters (QMF), details of which are described in R. E. Crochiere, Digital coding of speech in subbands, Bell Syst. Tech. J., vol. 55, No. 8, 1976.

An equal-bandwidth filtering technique is described in ICASSP 83, BOSTON, Polyphase Quadrature filters—A new subband coding technique, Joseph H. Rothweiler.

As the above-described spectrum transform, for example, an input audio signal is formed into blocks in predetermined time units (frames), and discrete Fourier transform (DFT), discrete cosine transform (DCT), or modified DCT (MDCT) is performed on the signal components in each block, thereby transforming a time-domain signal into a frequency-domain signal.

Details of MDCT are described in ICASSP 1987, Sub-band/Transform Coding Using Filter Bank Designs Based on Time Domain Aliasing Cancellation, J. P. Princen, A. B. Bradley, Univ. of Surrey, Royal Melbourne Inst. of Tech.

In the spectrum transform using the above-described DFT or DCT, when the spectrum transform is performed in a time block consisting of M samples, M items of independent real-number data are obtained. Generally, in order to reduce distortion at the connections between time blocks, M1 samples overlap between adjacent blocks, and thus, on average, in DFT or DCT, M items of real-number data are quantized and coded for (M-M1) samples.

In contrast, in the spectrum transform using the above-described MDCT, M items of independent real-number data are obtained from 2M samples, in which M samples overlap with half of adjacent blocks. Accordingly, in MDCT, M items of real-number data are quantized and coded for M samples. In a decoding apparatus, coded data obtained by performing MDCT is inverse-transformed in each block, and the resulting waveform components are added together while interfering with each other so as to reconstruct a waveform signal.

Generally, the spectrum frequency resolution is enhanced as the time block for spectrum transform becomes longer, thereby allowing energy to be concentrated in specific spectral components. As described above, in MDCT, the spectrum transform is performed with an increased block length by overlapping samples between adjacent blocks, and the number of spectral signal components remains the same as the original number of samples. By using such MDCT, coding can be performed with higher efficiency than by using DFT or DCT. Also, by allowing a sufficiently long overlapping portion between adjacent blocks, inter-block distortion of the waveform signal can be reduced.

By quantizing signal components divided into sub bands by using a filter or spectrum transform, bands in which quantizing noise is generated can be controlled, and high-efficiency coding can be performed by utilizing the masking effect. Before performing quantizing, if signal components in each band are normalized by the maximum of the absolute values of the signal components in the corresponding band, higher efficiency coding can be performed.

Signal components are divided into frequency bands with bandwidths considering, for example, human acoustic characteristics. That is, generally, an audio signal is divided into a plurality of bands (for example, 25 bands) so that the bandwidth of the higher bands, which are referred to as the "critical bands", becomes greater. Then, data in each band is coded according to a predetermined bit distribution or an adaptive bit allocation. For example, coefficient data obtained by the above-described MDCT processing in each block is coded by the number of adaptively allocated bits.

The following two bit allocation techniques are known.

One technique is disclosed in Adaptive Transform Coding of Speech Signals, R. Zelinski and P. Noll, IEEE Transactions of Acoustics, Speech, and Signal Processing, Vol. ASSP-25, No. 4, August 1977. In this technique, bit allocation is performed according to the magnitude of the signal in each band, and thus, the quantizing noise spectrum becomes smooth to minimize the noise energy. However, since the masking effect is not employed, the actual sound is not acoustically optimal.

The other technique is disclosed in ICASSP 1980, The Critical band coder—digital encoding of the perceptual requirements of the auditory system, M. A. Kransner, MIT. In this method, by utilizing the masking effect, fixed bit allocation is performed by obtaining a signal-to-noise (S/N) ratio required for each band. However, due to the fixed bit allocation, even when the characteristic of a sinusoidal wave input is measured, a precise value cannot be obtained.

In order to overcome the above drawbacks, the following high-efficiency coding apparatus has been proposed. Fixed bit allocation is partially performed on some blocks, and adaptive bit allocation is partially performed so that bits determined by the magnitudes of the signal components in the other blocks are allocated to the corresponding blocks. The division ratio of the two types of bit allocations is determined by an input signal, and the division ratio of the fixed bit allocation becomes higher as the signal spectrum becomes smoother.

According to the above-described coding apparatus, many bits can be allocated to blocks containing specific spectral components, such as sinusoidal waves, in which energy is concentrated, thereby making it possible to considerably improve the overall S/N ratio characteristics. Generally, the human acoustic characteristics are extremely sensitive to signals having sharp spectral components. Accordingly, an improved S/N ratio by using this method is effective not only in enhancing precise measurements, but also in improving the sound quality.

Many other bit allocation techniques have been proposed, and acoustic models are becoming increasingly precise. Accordingly, if the performance of a coding apparatus becomes higher, even higher efficiency coding is possible. In these methods, the bit-allocation real-number reference value is determined so that the calculated S/N ratio can be faithfully achieved, and the integer approximating the reference value is used as the number of allocation bits.

In International Publication No. WO94/28633 (corresponding to U.S. Pat. No. 5,717,821) filed by the present inventors, another coding method has been proposed in which tone components that are particularly important in an acoustic sense, i.e., signal components in which energy is concentrated, are extracted from a spectrum signal, and are separately coded from the other spectral components. According to this coding method, audio signals can be efficiently coded with a high compression ratio with very little degradation.

In forming code strings, quantizing-precision information and normalizing-coefficient information are coded with a predetermined number of bits in each band, and the resulting normalized and quantized spectrum signal is coded.

A high-efficiency coding method in which the number of bits representing the quantizing precision differs according to the band is described in ISO/IEC 11172-3: 1993(E), 1993. In this standard, the number of bits indicating the quantizing-precision information becomes smaller as the band becomes higher.

Instead of directly coding quantizing precision information, the quantizing-precision information may be determined from the normalizing-coefficient information in a decoding apparatus. According to this method, however, the relationship between the normalizing-coefficient information and the quantizing-precision information is determined when the standard is set, which makes it impossible to introduce the quantizing precision based on more precise acoustic models in the future. Additionally, if the compression ratio has a range, the relationship between the normalizing-coefficient information and the quantizing-precision information has to be determined according to each range.

Another known coding method is disclosed in D. A. Huffman: A Method for Construction of Minimum Redundancy Codes, Proc. I.R.E., 40, p.1098 (1952). In this method, a quantized spectrum signal is coded more efficiently by using variable codes.

The signal coded as described above can be encrypted and distributed, as in PCM signals, in which case, those who have not obtained the corresponding key are unable to play back the original signal. Alternatively, instead of encrypting a coded bit string, a PCM signal may be converted into a random signal, which is then coded for compression. It is also impossible for users who have not obtained the corresponding key to play back the original signal.

In this so-called-scrambling method, however, without the key, the software data cannot be checked. Also, if the user plays back the data with regular playback means, only noise is heard. Accordingly, this method cannot be used for, for example, the following application. A disk in which music with a relatively low audio quality is recorded is distributed, and after listening to the disk, the user purchases the key only for a music piece that he or she likes and is able to play back that music piece with high audio quality. Alternatively, after listening to the distributed disk, the user is able to purchase a new disk in which music is recorded at high quality.

When encrypting signals subjected to high-efficiency coding, it is very difficult to maintain the compression efficiency while providing code strings that are meaningful for regular playback means. That is, when a scrambled code string is played back, as described above, only noise is heard, and also, playback means may not operate at all if the scrambled code string is not compatible with the original high-efficiency code standard. Also, if a scrambled PCM signal is coded with high efficiency by decreasing the amount of information by utilizing the acoustic characteristics, the scrambled PCM signal cannot always be reproduced when the coded signal is decoded. Thus, it is difficult to descramble the signal. Accordingly, a method for precisely descrambling the signal must be employed by sacrificing the compression efficiency.

U.S. Pat. No. 6,081,784 or Japanese Unexamined Patent Application Publication No. 10-135944 filed by the present inventors discloses the following audio coding method. In this method, among spectral signal components coded from a music signal, signal components only in higher bands are encrypted, thereby enabling users to play back a preview file (trial file) without a corresponding key. More specifically, in this method, signal components only in higher bands are encrypted, and also, high-band bit allocation information is replaced by dummy data, true bit allocation information being recorded in a position ignored by decoders. According to this method, the users are able to enjoy music pieces that please them with high audio quality after listening to the preview file.

In this method, however, since the security is uniquely dependent on encryption, if the data is deciphered, high-quality music can be illegally played back.

In order to overcome this drawback, International Publication No. WO02/065449 discloses the following method. Part of the information to be recorded in a recording medium is replaced by dummy data so that it can be played back at relatively low quality, and when it becomes necessary to play back the information with high quality, the dummy data is replaced by true data, thereby eliminating the possibility of the data being deciphered. Additionally, data can be played back by regular playback devices regardless of whether the data is recorded with high quality or low quality.

According to this method, the data can be played back with high quality after checking the content while enhancing the security compared to a method employing an encryption key.

According to the above method, however, dummy data must be replaced by high quality data, and the amount of such data is large, though it is smaller than a preview file. Accordingly, it takes time to transmit the required data, thereby increasing the overall time.

Thus, in International Application No. PCT/JP03/04526 or Japanese Patent Application No. 2002-107084, the present inventors have proposed that part of the dummy data be contained in preview data, and the amount of true data in a high quality file required for replacing the dummy data when the data is played back with high quality is reduced, thereby decreasing the overall time. To implement this, when the number of coding units indicating the number of bands to be coded is contained in an original code string, a small value is written in the original code string as dummy data so that the code string is played back in accordance with the dummy data, and part of the true coding information is recorded in a position ignored by a decoder. With this method, the amount of data required for achieving a high-quality playback operation can be reduced.

If high quality data is encrypted and then sold, network transactions are possible.

According to the above-described method, the true coding information (true band information) has to be recorded in a high-quality file. If the bandwidth is changed in every frame when coding the data, such a change becomes noticeable as noise. Thus, the true band information is normally set to the same value without being changed. Then, when decrypting the key information of the high-quality file, it is highly likely that the same band information appears in regular positions. Such an analysis can be automatically performed by using, for example, a computer, thereby increasing the possibility of the high-quality file being deciphered.

SUMMARY OF THE INVENTION

Accordingly, in order to solve the above-described problems, it is an object of the present invention to prevent important data from being deciphered by separating regularly appearing data items in an encrypted file from the important data and by not encrypting such data items, or by encrypting such data items separately from the important data.

In order to achieve the above object, according to one aspect of the present invention, there is provided a code-string generating method including: a generation step of generating a first code string and a second code string from at least part of an original code string obtained by coding a signal, the first code string containing a code string having a low playback quality and the second code string being used for increasing the quality of a playback signal of the first code string; and an encryption step of encrypting the second code string. In the encryption step, a first portion of the second code string having an exactly or almost regular pattern is encrypted by a first encryption process, or the first portion is not encrypted, and a second portion, which is part of the second code string other than the first portion, is encrypted by a second encryption process different from the first encryption process.

In the above method, "having an exactly or almost regular pattern" means that all the data items can be found by predetermined processing, or a predetermined ratio, for example, 90%, of the data items can be found by predetermined processing, for example, the values of data items are the same or are increased by one at regular intervals.

The first encryption process and the second encryption process can be differentiated by changing the algorithm or the encryption key. The length of the processing unit of the first and/or the second portion of the second code string can be set to an integral multiple of the length of the processing unit of the encryption processing algorithm, thereby increasing the encryption processing rate.

The first portion of the second code string may include at least one of playback band information and synchronizing signal information. The first and second code strings do not have to be completely separated into different bit streams. For example, the first or second portion of the second code string may be embedded into a portion of the first code string which is ignored by a normal signal playback step. In this case, it is preferable that the first or second portion of the second code string be identified separately from the data of the first code string by, for example, being embedded in a predetermined position of the first code string, or by adding an ID code, or by including information indicating the position at which the first or second portion is embedded in the second code string.

The above-described generation step may include a replacement step of replacing at least part of the original code string by dummy data. Then, the first code string may contain the dummy data and the original code which is not replaced by the dummy data, and the second code string may contain part of or all of true data of the original code string which is replaced by the dummy data.

In this case, various portions, such as portions corresponding to spectrum coefficients of the original code string and coding parameters, can be replaced by dummy data. If the present invention is applied to, for example, the distribution of audio signals, various portions in audio code strings, such as intermediate-spectrum coefficients, high-band normalizing coefficient information and/or quantizing precision information, and quantizing units, can be replaced by dummy data. Replacement of such data by dummy data can be made in units of frames, and within the same frame, only part of or the whole frame can be replaced. Also, according to the type of true data to be replaced by dummy data, the configuration of the dummy data may be changed, or the true data may be replaced in various manners.

Part of or all of the true data of the original code string, which is different from the true data contained in the second code string, may be contained at a position in the first code string and that is different from the dummy data. That is, in the present invention, the true data does not have to be wholly contained in the second code string, that is, part of the true data may be contained in the second code string, and the rest of the true data may be contained in the first code string. In this case, it is preferable that the true data contained in the first code string may be encrypted or scrambled. Alternatively, it may be contained in the first code string at a position that cannot be played by a normal decoder, thereby preventing the true data being played back by a simple playback operation of the first code string.

According to another aspect of the present invention, there is provided a code-string generating apparatus including: a generator for generating a first code string and a second code string from at least part of an original code string obtained by coding a signal, the first code string containing a code string having a low playback quality and the second code string being used for increasing the quality of a playback signal of the first code string: and an encryption unit for encrypting the second code string. In the encryption unit, a first portion of the second code string having an exactly or almost regular pattern is encrypted by a first encryption process, or the first portion is not encrypted, and a second portion, which is part of the second code string other than the first portion, is encrypted by a second encryption process different from the first encryption process.

According to still another aspect of the present invention, there is provided a code-string decrypting method including: a first decryption step of decrypting by a first decryption process, or not decrypting, a first encrypted code string corresponding to a first portion of a code string which has an exactly or almost regular pattern before being encrypted; and a second decryption step of decrypting a second encrypted code string corresponding to a second portion, which is part of the code string other than the first portion, by a second decryption process different from the first decryption process. In this case, the length of the processing unit of the first and/or the second portion can be set to an integral multiple of the length of the processing unit of the encryption processing algorithm, thereby increasing the decryption processing rate.

According to a further aspect of the present invention, there is provided a code-string decrypting apparatus including: a first decryption unit for decrypting by a first decryption process, or for not decrypting, a first encrypted code string corresponding to a first portion of a code string which has an exactly or almost regular pattern before being encrypted; and a second decryption unit for decrypting a second encrypted code string corresponding to a second portion, which is part of the code string other than the first portion, by a second decryption process different from the first decryption process.

According to a yet further aspect of the present invention, there is provided a code-string encrypting method including the steps of: separating a code string into a first code-string portion having an exactly or almost regular pattern and a second code-string portion other than the first code-string portion; and encrypting, or not encrypting, the first code-string portion by a first process, and encrypting the second code-string portion by a second process different from the first process.

According to a further aspect of the present invention, there is provided a code-string encrypting apparatus including a unit for separating a code string into a first code-string portion having an exactly or almost regular pattern and a second code-string portion other than the first code-string portion, and for encrypting, or not encrypting, the first code-string portion by a first process, and encrypting the second code-string portion by a second process different from the first process.

According to a further aspect of the present invention, there is provided a recording medium including: a first code-string portion having an exactly or almost regular pattern encrypted or not encrypted by a first process; and a second code-string portion other than the first code-string portion encrypted by a second process different from the first process.

According to the present invention, the possibility of an encrypted file being deciphered becomes low. The security of a high-quality file for increasing the quality of audio code strings of a preview file can be enhanced. The security when encrypting audio code strings themselves can also be enhanced.

DESCRIPTION OF THE PREFERRED EMBODIMENTS

The present invention is described in detail below with reference to the accompanying drawings through illustration of preferred embodiments.

Figure 1:
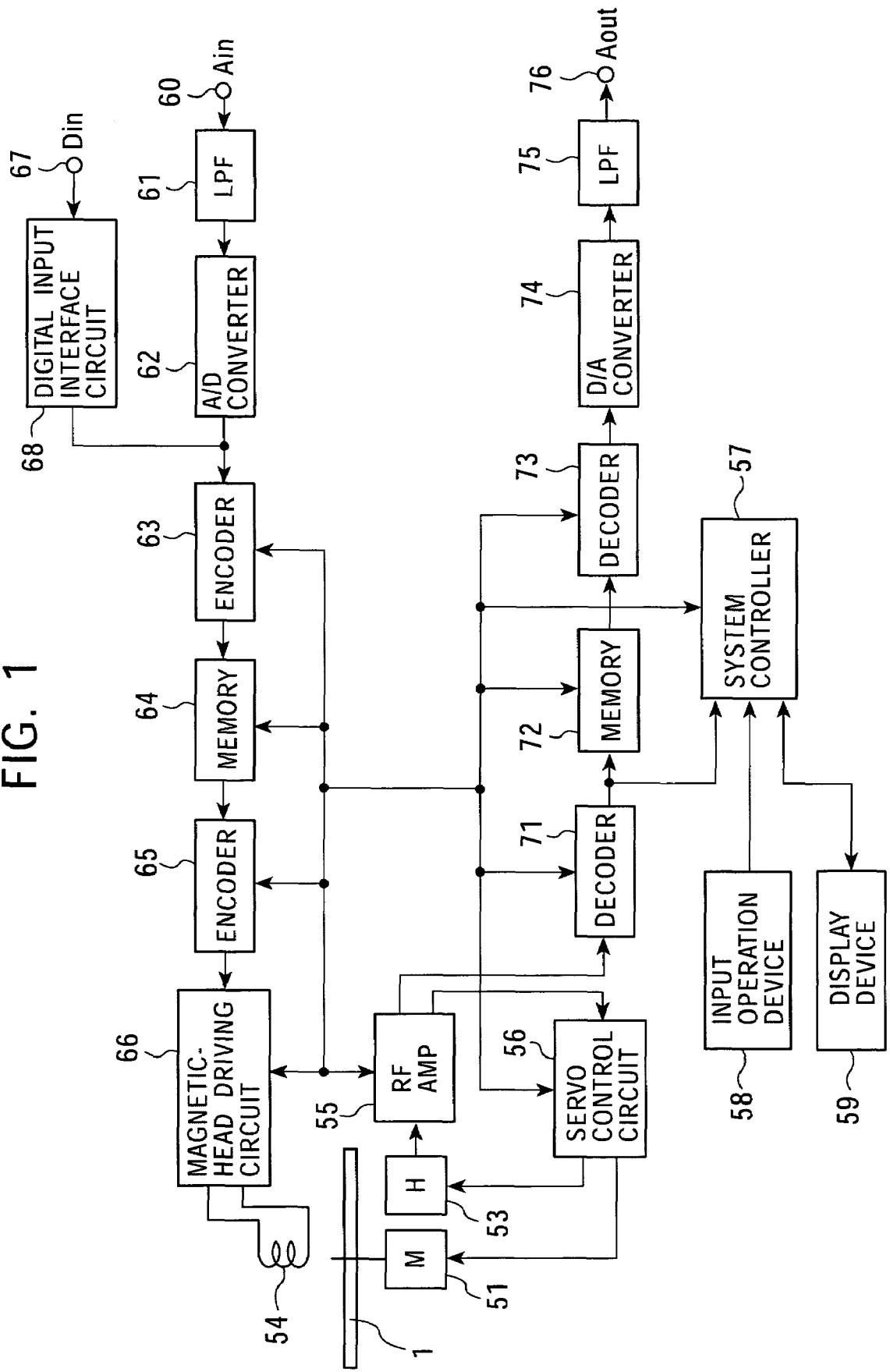
FIG. 1 is a block circuit diagram illustrating a compressed-data recording/playback apparatus according to the present invention.

FIG. 1 is a block diagram illustrating a compressed-data recording/playback apparatus according to an embodiment of the present invention. Details of the specific configuration of the recording/playback apparatus are given below. In the recording/playback apparatus, a magneto-optical disk 1, which is driven by a spindle motor 51, is used as a recording medium. When recording data on the magneto-optical disk 1 along recording tracks, so-called "magnetic modulation recording" is performed by applying a modulated magnetic field corresponding to the recording data to the magneto-optical disk 1 from a magnetic head 54 while applying laser light from an optical head 53. When playing back data from the magneto-optical disk 1, the recording tracks are traced with laser light by the optical head 53.

The optical head 53 is formed of a laser light source, such as a laser diode, optical elements, such as a collimator lens, an object lens, a polarizing beam splitter, and a cylindrical lens, and a photodetector provided with a light-receiving portion having a predetermined pattern. The optical head 53 is disposed such that it faces the magnetic head 54 with the magneto-optical disk 1 therebetween. When recording data on the magneto-optical disk 1, the magnetic head 54 is driven by a magnetic-head driving circuit 66 of a recording system, which is described below, so as to apply a modulated magnetic field corresponding to the recording data, and also, laser light is applied to a target track of the magneto-optical disk 1 by the optical head 53, thereby performing thermo-magnetic recording according to the magnetic modulation method. The optical head 53 also detects light reflected by the target track irradiated with laser light so as to detect focus errors by, for example, the astigmatism, and detect tracking errors by, for example, the push-pull method. When playing back data from the magneto-optical disk 1, the optical head 53 detects the above-described focus errors and tracking errors, and also detects the difference of the polarizing angle (Kerr rotation angle) of the reflected light from the target track, thereby generating a playback signal.

An output of the optical head 53 is supplied to an RF circuit 55. The RF circuit 55 extracts the above-described focus error signal and tracking error signal from the output of the optical head 53, and supplies them to a servo control circuit 56. The RF circuit 55 also binarizes the playback signal and supplies it to a decoder 71 of a playback system, which is described below.

The servo control circuit 56 is formed of, for example, a focus servo control circuit, a tracking servo control circuit, a spindle-motor servo control circuit, and a sled servo control circuit. The focus servo control circuit performs focus control on the optical system of the optical head 53 so that the above-described focus error signal becomes zero. The tracking servo control circuit performs tracking control on the optical system of the optical head 53 so that the above-described tracking error signal becomes zero. The spindle-motor servo control circuit controls the spindle motor 51 so that the magneto-optical disk 1 is rotated at a predetermined rotational speed (for example, constant linear speed). The sled servo control circuit moves the optical head 53 and the magnetic head 54 to the position of a target track designated by the system controller 57. The servo control circuit 56, which performs the above-described various control operations, sends information indicating the operating statuses of the individual elements to the system controller 57.

A key input operation device 58 and a display device 59 are connected to the system controller 57. The system controller 57 controls the recording system and the playback system upon receiving operation information input via the key input operation device 58. The system controller 57 controls the recording position and the playback position on a recording track traced by the optical head 53 and the magnetic head 54 based on address information of each sector, which is played back from the recording track by using the header time or sub-code Q data. The system controller 57 also controls the display device 59 to display the playback time based on the data compression ratio of the recording/playback apparatus shown in FIG. 1 and information on the playback position of the recording track.

The playback time is calculated as follows. The address information (absolute time information) of each sector, which is played back from the recording track of the magneto-optical disk 1 based on the header time or the sub-code Q data, is multiplied by the reciprocal of the data compression ratio (for example, if the compression ratio is 1/4, the reciprocal is 4). The resulting actual time information is displayed on the display device 59. Not only during the playback operation, but also during the recording operation, if absolute time information is pre-recorded (pre-formatted) in a recording track of a magneto-optical disk, it may be read and then multiplied by the reciprocal of the data compression data, thereby making it possible to display the current position by the actual recording time.

In the recording system of this recording/playback apparatus, an analog audio input signal Ain from an input terminal 60 is supplied to an analog-to-digital (A/D) converter 62 via a low-pass filter 61, and is quantized in the A/D converter 62. A digital audio signal output from the A/D converter 62 is supplied to an adaptive transform coding (ATC) encoder 63. Meanwhile, a digital audio signal Din from an input terminal 67 is supplied to the ATC encoder 63 via a digital input interface circuit 68. The ATC encoder 63 performs bit compression (data compression) according to a predetermined data compression ratio on the digital audio PCM data at a predetermined transfer rate, which is obtained by quantizing the input signal Ain by the A/D converter 62.

The compressed data (ATC data) output from the ATC encoder 63 is supplied to a memory 64. If the data compression ratio is, for example, 1/8, the data transfer rate is reduced to 1/8 (9.375 sectors/second) of the data transfer rate (75 sectors/second) of the standard CD-DA.

The reading and writing of data from and into the memory 64 is controlled by the system controller 57, and the memory 64 serves as a buffer memory for temporarily storing the ATC data supplied from the ATC encoder 63 and for recording it on the disk 1 if necessary. More specifically, if the data compression ratio is, for example, 1/8, the data transfer rate of the compressed audio data supplied from the ATC encoder 63 is reduced to 9.375 sectors/second, which is 1/8 of the data transfer rate (75 sectors/second) of the standard CD-DA format, and this compressed data is continuously written into the memory 64. It is sufficient that only one eighth of the sectors of this compressed data (ATC data) be recorded. In practice, however, it is almost impossible to record data every eight sectors, and thus, the consecutive-sector recording, which is described below, is performed.

In this recording, burst-recording is performed with a recording pause at a data transfer rate (75 sectors/second), which is the same as that of the standard CD-DA format, by using a cluster consisting of a predetermined plurality of sectors (for example, 32 sectors plus several sectors) as the recording unit. That is, in the memory 64, the ATC audio data having a 1/8 data compression ratio continuously written into the memory 64 at a low transfer rate of 9.375 (=75/8) is read at the above-described transfer rate of 75 sectors/second. Although the overall transfer rate of the data read and recorded as described above including a recording pause is as low as 9.375 sectors/second, the instantaneous data transfer rate during the burst-recording operation time results in 75 sectors/second. Accordingly, when the disk rotational speed is the same as the transfer rate (constant linear speed) of the standard CD-DA format, recording is performed with the same recording density and the same storage pattern as those of the standard CD-DA format.

The ATC audio data, i.e., recording data, read from the memory 64 at an instantaneous transfer rate of 75 sectors/second is supplied to an encoder 65. The amount of data continuously recorded into the encoder 65 at one time is one cluster consisting of a plurality of sectors (for example, 32 sectors) and a few cluster-connecting sectors disposed before and after the cluster. The cluster-connecting sectors are set to be longer than the interleaving length in the encoder 65 so as to prevent the cluster-connecting sectors from influencing the other clusters even if interleaving is performed.

The encoder 65 performs error-correcting coding (parity addition and interleaving) and eight-to-fourteen modulation (EFM) coding on the recording data supplied from the memory 64. The coded recording data is supplied to the magnetic-head driving circuit 66. The magnetic-head driving circuit 66 is connected to the magnetic head 54 so as to drive it to apply a modulated magnetic field corresponding to the recording data to the magneto-optical disk 1.

As described above, the system controller 57 controls the reading and writing of data from and into the memory 64, and also controls the recording positions so that the data read from the memory 64 is continuously recorded into the recording tracks of the magneto-optical disk 1. More specifically, the system controller 57 controls the recording position by supplying a control signal indicating the recording position on a recording track of the magneto-optical disk 1 to the servo control circuit 56.

The playback system is now described below. The playback system plays back the data continuously recorded on the recording tracks of the magneto-optical disk 1 by the above-described recording system. The playback system is provided with the decoder 71. A playback output obtained by tracing the recording tracks of the magneto-optical disk 1 with laser light by the optical head 53 is binarized in the RF circuit 55 and is supplied to the decoder 71. In this case, not only magneto-optical disks, read only optical discs, such as compact discs, can be read.

The decoder 71 corresponds to the encoder 65 of the recording system, and performs error-correcting decoding and EFM decoding on the playback output binarized by the RF circuit 55. The ATC audio data having a data compression rate of 1/8 is played back at a transfer rate of 75 sectors/second, which is higher than the normal transfer rate. The playback data obtained by the decoder 71 is supplied to a memory 72.

The reading and writing of data from and into the memory 72 is controlled by the system controller 57. Burst-writing is performed on playback data supplied from the decoder 71 at a transfer rate of 75 sectors/second into the memory 72 at a transfer rate of 75 sectors/second. The playback data written into the memory 72 at the transfer rate of 75 sectors/second is continuously read from the memory 72 at a transfer rate of 9.375 sectors/second, which is equivalent to the data compression ratio of 1/8.

The system controller 57 controls the playback data to be written into the memory 72 at a transfer rate of 75 sectors/second and also to be continuously read from the memory 72 at a transfer rate of 9.375 sectors/second. The system controller 57 also controls the playback positions so that the playback data written into the memory 72 can be continuously played back from the recording tracks of the magneto-optical disk 1. More specifically, the system controller 57 controls the playback position by supplying a control signal indicating the playback position on a recording track of the magneto-optical disk 1 or the optical disc 1 to the servo control circuit 56.

ATC audio data obtained as the playback data continuously read from the memory 72 at a transfer rate of 9.375 sectors/second is supplied to an ATC decoder 73. The ATC decoder 73, which corresponds to the ATC encoder 63 of the recording system, performs data decompression (bit decompression) on the ATC data by, for example, eight times, thereby playing back 16-bit digital audio data. The digital audio data is then supplied to a digital-to-analog (D/A) converter 74.

The D/A converter 74 converts the digital audio data supplied from the ATC decoder 73 into an analog signal so as to form an analog audio output signal Aout. The analog audio signal Aout is then output from an output terminal 76 via a low-pass filter 75.

Details of high-compression coding are described below. High-efficiency coding operations on input digital signals, such as audio PCM signals, using techniques, such as SBC, ATC, and adaptive bit allocation, are discussed below with reference to FIGS. 2 through 35.

Figure 2:
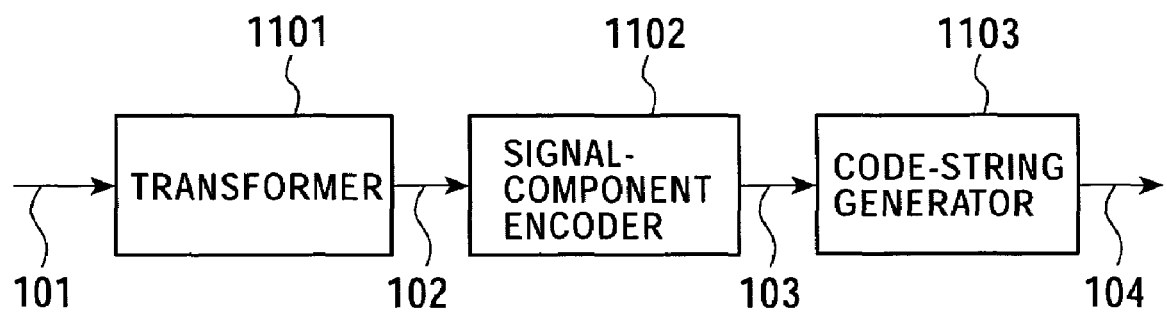
FIG. 2 is a block diagram illustrating a coding apparatus according to the present invention.

FIG. 2 is a block diagram illustrating a coding apparatus for acoustic wave signals according to the present invention. In this coding apparatus, an input signal waveform 101 is transformed into signal frequency components 102 by a transformer 1101, and each signal component 102 is then coded by a signal-component encoder 1102, resulting in coded signal components 103. Then, a code string 104 is generated from the coded signal components 103 by a code-string generator 1103.

Figure 3:
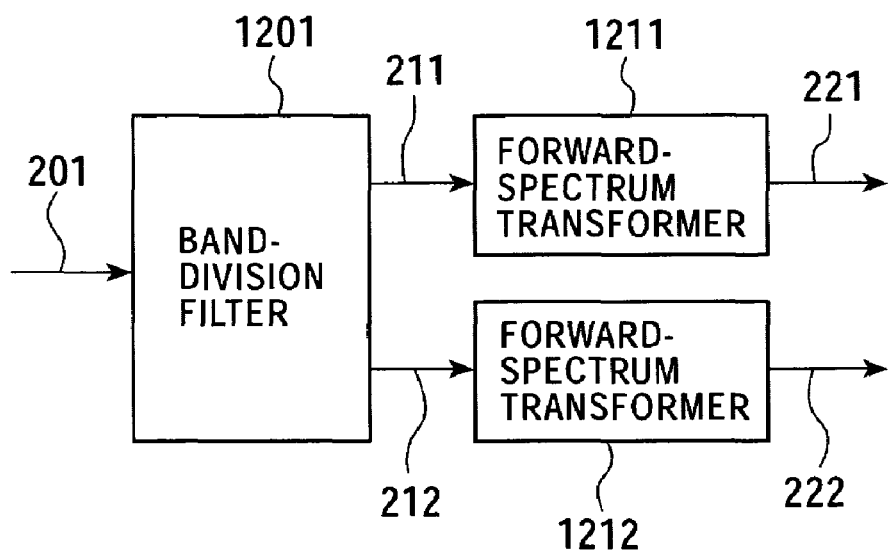
FIG. 3 is a block diagram illustrating an example of a transformer used in the coding apparatus shown in FIG. 2.

FIG. 3 illustrates an example of the transformer 1101 shown in FIG. 2. In FIG. 3, a signal 201 is divided into two bands by a band-division filter 1201, resulting in signal components 211 and 212. The signal components 211 and 212 are transformed into spectral signal components 221 and 222 by forward-spectrum transformers 1211 and 1212, respectively, employing a technique, for example, MDCT. The signal 201 shown in FIG. 3 is equivalent to the signal waveform 101 shown in FIG. 2, and the signal components 221 and 222 shown in FIG. 3 are equivalent to the signal frequency component 102 shown in FIG. 2. In the transformer 1101 shown in FIG. 3, the bandwidth of the signal components 211 and 212 is 1/2 of that of the signal 201. As the transformer 1101, transformers other than the example shown in FIG. 3 can be considered. For example, an input signal may be directly transformed into a spectrum signal. Alternatively, a signal may be transformed by DFT or DCT. Although a signal may be divided into band components by a band-division filter, the present invention is most effective by performing the above-described spectrum transform in which many frequency components can be obtained by a relatively small amount of computation.

Figure 4:
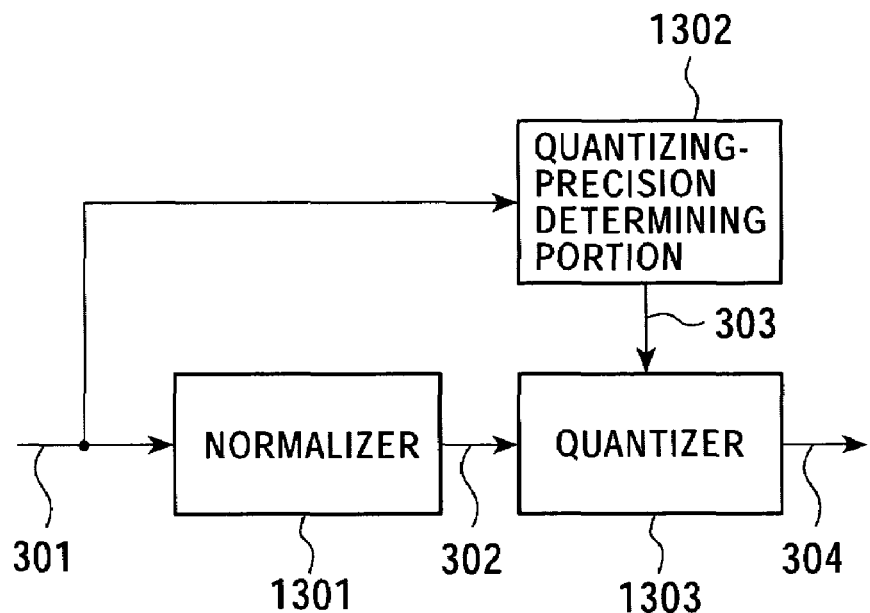
FIG. 4 is a block diagram illustrating an example of a signal-component encoder used in the coding apparatus shown in FIG. 2.

FIG. 4 is an example of the signal-component encoder 1102. Each signal component 301 is normalized in predetermined each band by a normalizer 1301, and a normalized signal component 302 is quantized by a quantizer 1303 based on quantizing precision calculated by a quantizing-precision determining portion 1302, resulting in a quantized signal component 304. The signal component 301 in FIG. 4 is equivalent to the signal frequency component 102 in FIG. 2, and the quantized signal component 304 in FIG. 4 is equivalent to the coded signal components 103 in FIG. 2. The quantized signal component 304 also includes normalizing-coefficient information and quantizing-precision information.

Figure 5:
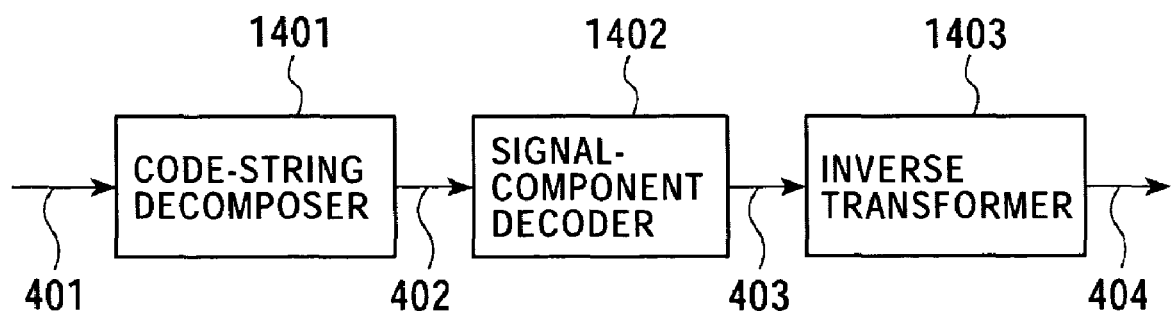
FIG. 5 is a block diagram illustrating a decoding apparatus according to the present invention.

FIG. 5 is a block diagram illustrating a decoding apparatus for outputting an acoustic signal from a code string generated by the coding apparatus shown in FIG. 2. In this decoding apparatus, signal component codes 402 are extracted from a code string 401 by a code-string decomposer 1401, and signal components 403 are reproduced from the codes 402 by a signal-component decoder 1402. The signal components 403 are then inverse-transformed into an acoustic waveform signal 404 by an inverse transformer 1403.

Figure 6:
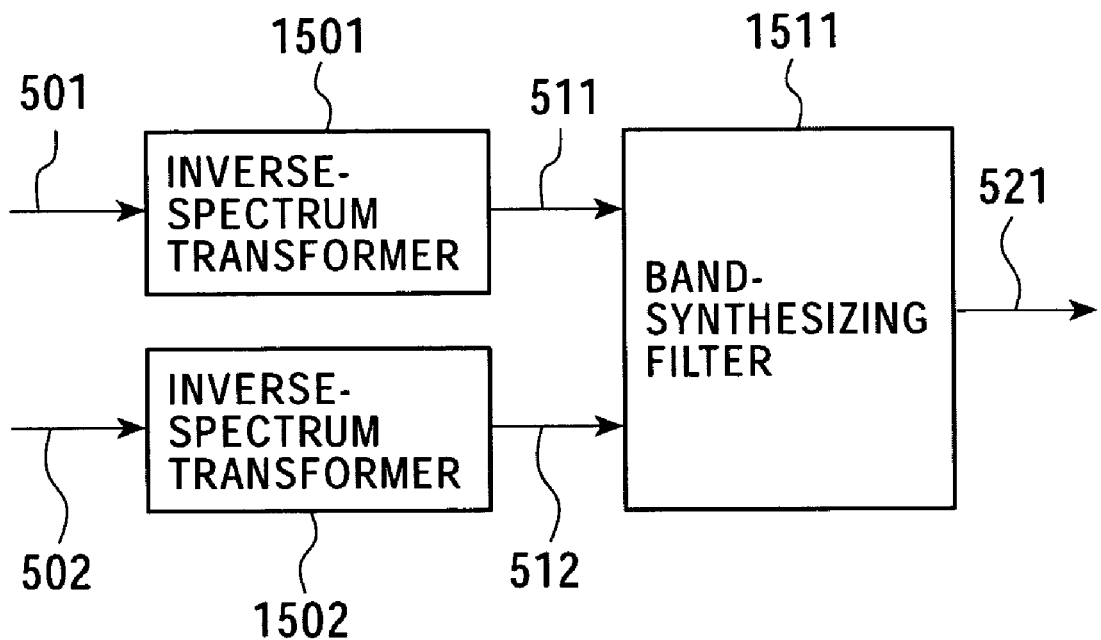
FIG. 6 is a block diagram illustrating an example of an inverse transformer used in the decoding apparatus shown in FIG. 5.

FIG. 6 illustrates an example of the inverse transformer 1403, which corresponds to the transformer 1101 configured as shown in FIG. 3. Signal components 511 and 512 transformed from signal components 501 and 502 by inverse-spectrum transformers 1501 and 1502 are combined by a band-synthesizing filter 1511. The signal components 501 and 502 in FIG. 6 corresponds to the signal components 403 in FIG. 5, and a synthesized signal 521 in FIG. 6 corresponds to the acoustic waveform signal 404 in FIG. 5.

Figure 7:
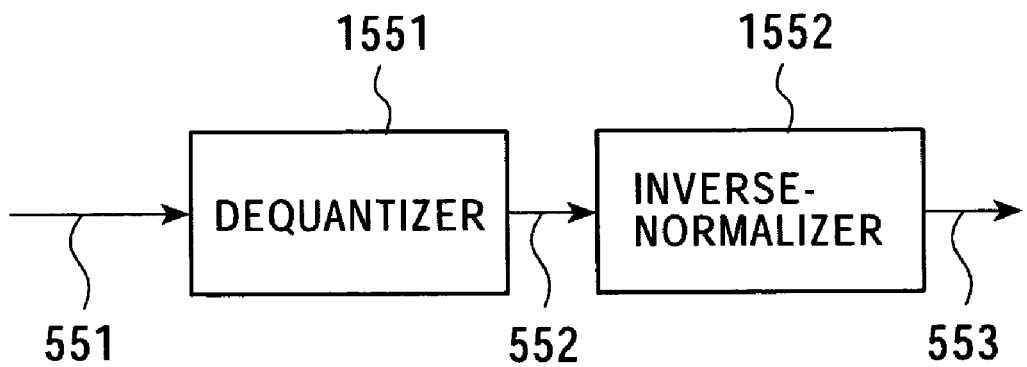
FIG. 7 is a block diagram illustrating an example of a signal-component decoder used in the decoding apparatus shown in FIG. 5.

FIG. 7 illustrates an example of the signal-component decoder 1402 shown in FIG. 5. Each spectrum signal 551 is dequantized by a dequantizer 1551, and is then inverse-transformed into an inverse-transformed signal 553 by an inverse normalizer 1552. The spectrum signal 551 is equal to the code 402 in FIG. 5, and the inverse-transformed signal 553 is equal to the signal component 403 in FIG. 5.

Figure 8:
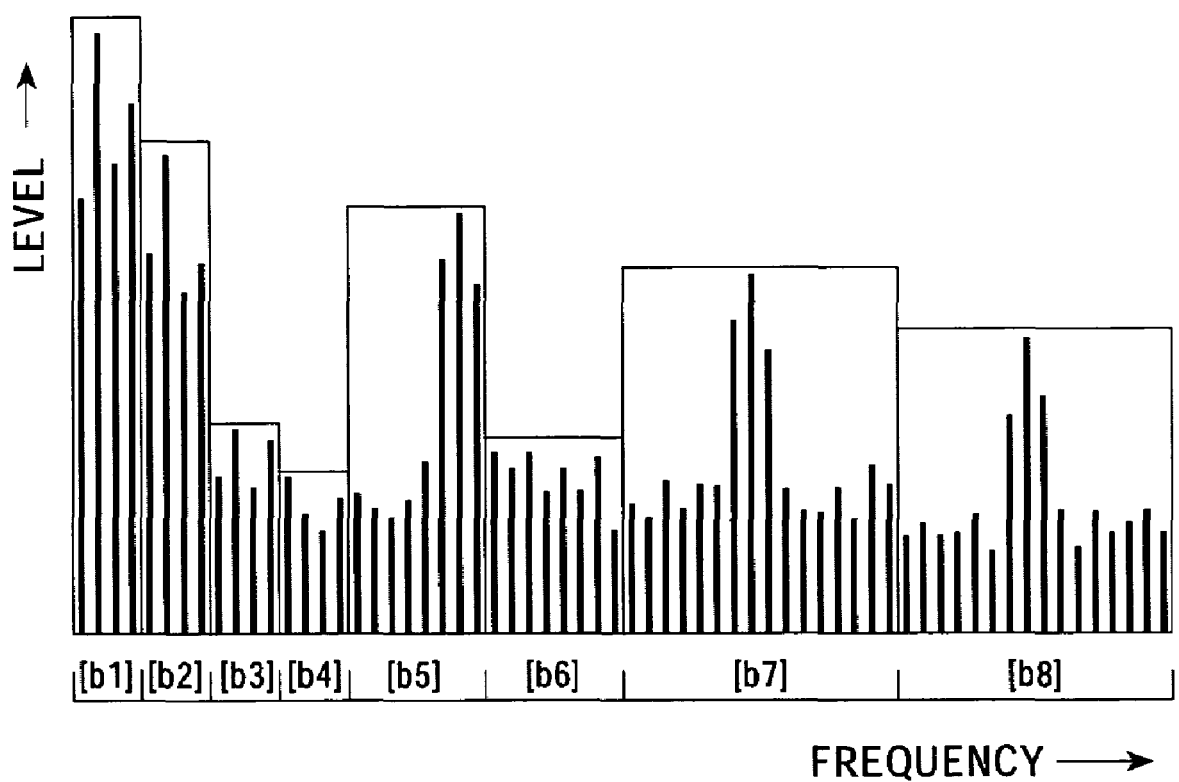
FIG. 8 illustrates a coding method according to the present invention.

FIG. 8 illustrates an example of coding methods to be performed in the coding apparatus shown in FIG. 2. In this method, spectral signal components are obtained by the transformer 1101 shown in FIG. 3, and the absolute values of the spectral signal components transformed by using the MDCT are converted into dB. The input signal has been converted into 64 spectral signal components in predetermined time blocks, and the spectral signal components in each of eight bands [b1] through [b8] (hereinafter referred to as the "coding units") are normalized and quantized together. By changing the quantizing precision in each coding unit according to the distribution of the frequency components, coding can be performed with acoustically high efficiency while minimizing the loss of the audio quality.

Figure 9:
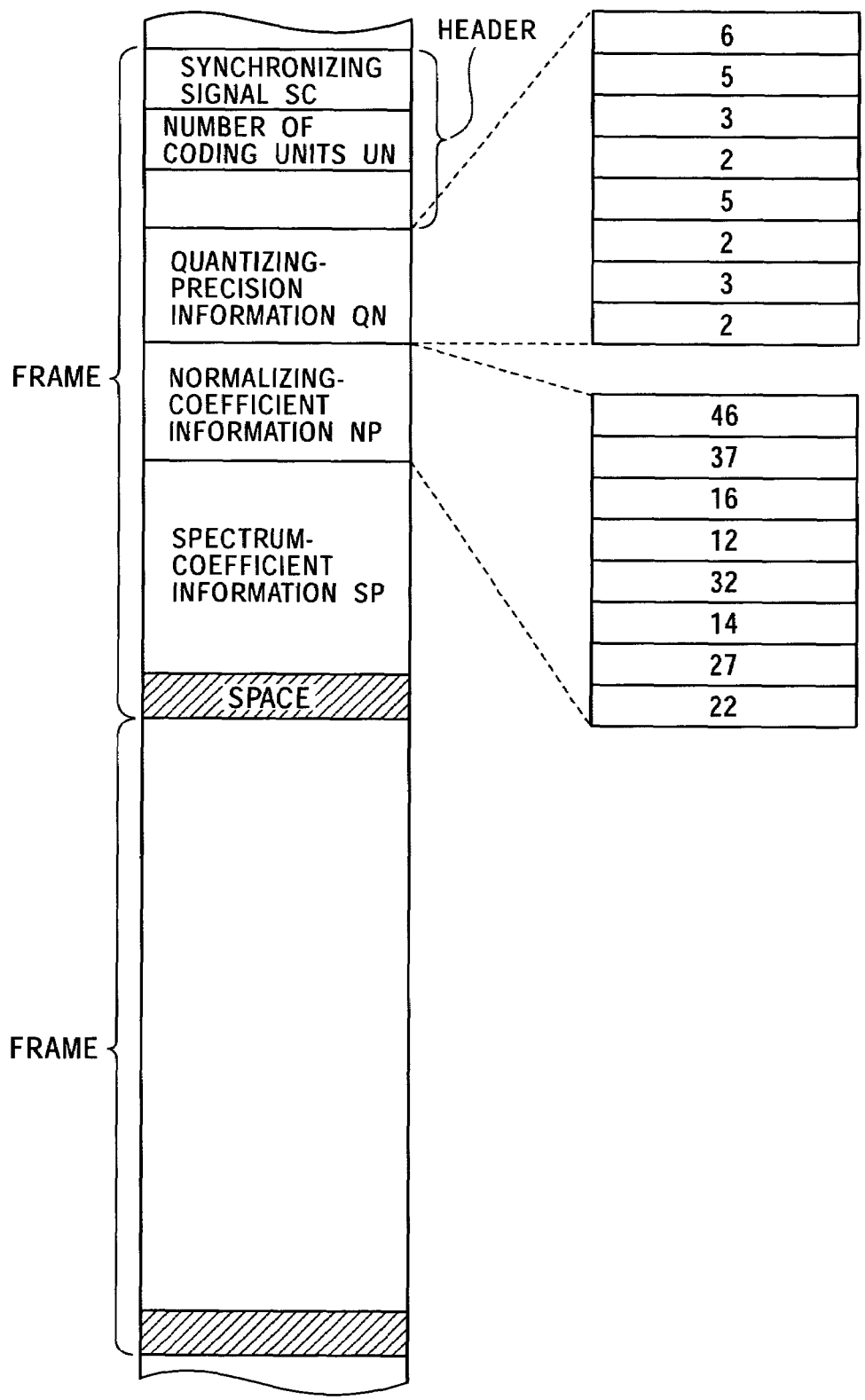
FIG. 9 illustrates an example of a format implemented by a coding method of the present invention.

FIG. 9 illustrates an example of a recording medium on which the signal coded as described above is recorded. In this example, a fixed-length header containing a synchronizing signal SC and the number of coding units UN is attached at the head of each frame. After the header, quantizing-precision information having the same number of items as the number of coding units is recorded, and then, normalizing-precision information having the same number of items as the number of coding units is recorded. Subsequently, the normalized and quantized spectrum-coefficient information is recorded. If the length of a frame is fixed, a space may be created after the spectrum-coefficient information. The signal shown in FIG. 9 is obtained by coding the spectrum signal in FIG. 8. As the quantizing-precision information, 6 bits are assigned to the coding unit in the lowest band, and 2 bits are assigned to the coding unit in the highest band, as shown in FIG. 9. As the normalizing-coefficient information, the value 46 is assigned to the coding unit in the lowest band, and the value 22 is assigned to the coding unit in the highest band, as shown in FIG. 9. The values used as the normalizing-coefficient information are proportional to the dB values.

The coding efficiency achieved by the above-described coding method can further be improved. For example, among quantized spectral components, a relatively short code length can be assigned to signal components which appear with higher frequency, and a relatively long code length can be assigned to signal components which appear with lower frequency, thereby enhancing the coding efficiency. Also, by increasing the transform block length, the amount of sub information, such as quantizing-precision information and normalizing-coefficient information, can be relatively reduced, and also, the frequency resolution can be increased, thereby making it possible to more precisely control the quantizing precision in the frequency domain. As a result, the coding efficiency can be enhanced.

In International Publication No. WO94/28633 (corresponding to U.S. Pat. No. 5,717,821) filed by the present inventors, another coding method has been proposed in which tone components that are particularly important in an acoustic sense, i.e., signal components having energy being concentrated in specific frequencies, are extracted from a spectrum signal, and are separately coded from the other spectral components. According to this coding method, audio signals can be efficiently coded with a high compression ratio with very little degradation.

Figure 10:
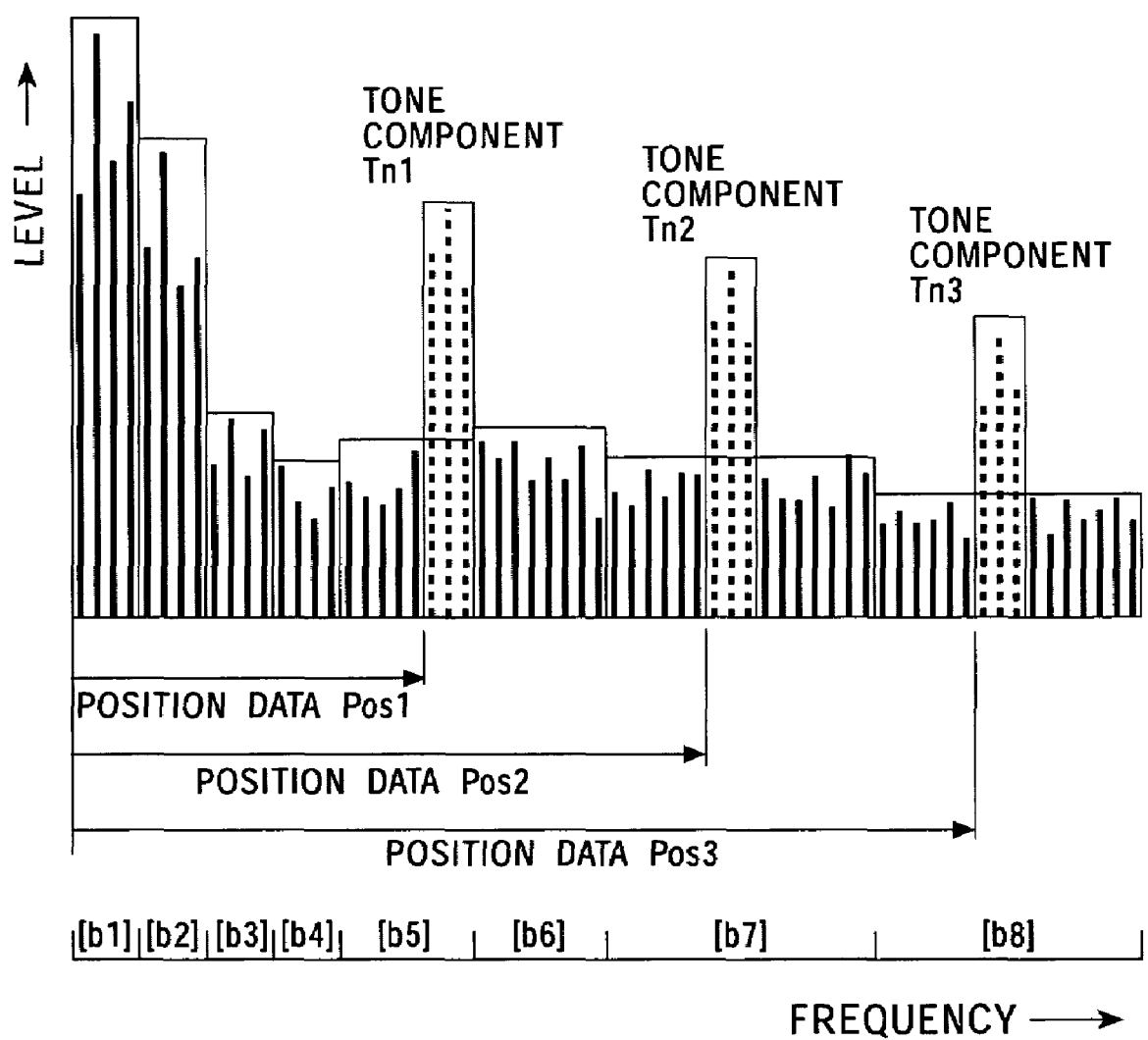
FIG. 10 illustrates another coding method according to the present invention.

FIG. 10 illustrates the above-described coding method. Signal components having higher levels are separated from a spectrum signal as tone components Tn1 through Tn3, and are then coded separately. Although position information, for example, position data Pos1 through Pos3, are required for the tone components Tn1 through Tn3, the spectrum signal from which the tone components Tn1 through Tn3 are removed can be quantized with a smaller number of bits. According to this method, therefore, high-efficiency coding can be performed.

Figure 11:
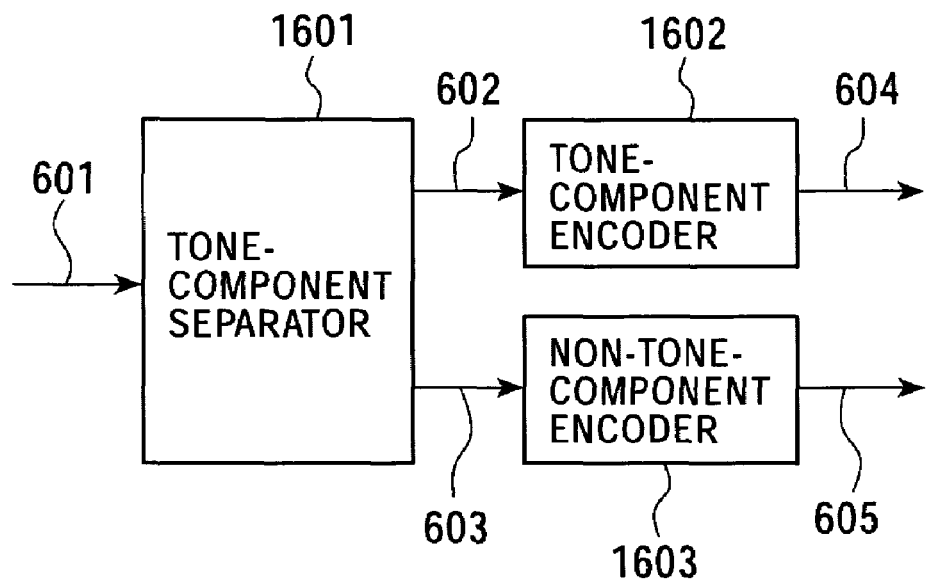
FIG. 11 is a block diagram illustrating another example of the signal-component encoder.

FIG. 11 illustrates the configuration of the signal-component encoder 1102 shown in FIG. 2 when the above-described coding method is employed. A signal 601 equivalent to the signal component 102 of the transformer 1101 in FIG. 2 is separated into a tone component 602 and a non-tone component 603 by a tone-component separator 1601, and the tone component 602 and the non-tone component 603 are coded by a tone-component encoder 1602 and a non-tone-component encoder 1603, respectively, resulting in a tone-component code string 604 and a non-tone-component code string 605, respectively. The tone-component encoder 1602 and the non-tone-component encoder 1603 are configured similarly to the signal-component encoder 1101 shown in FIG. 2, except that the tone-component encoder 1602 also codes the position information of the tone components.

Figure 12:
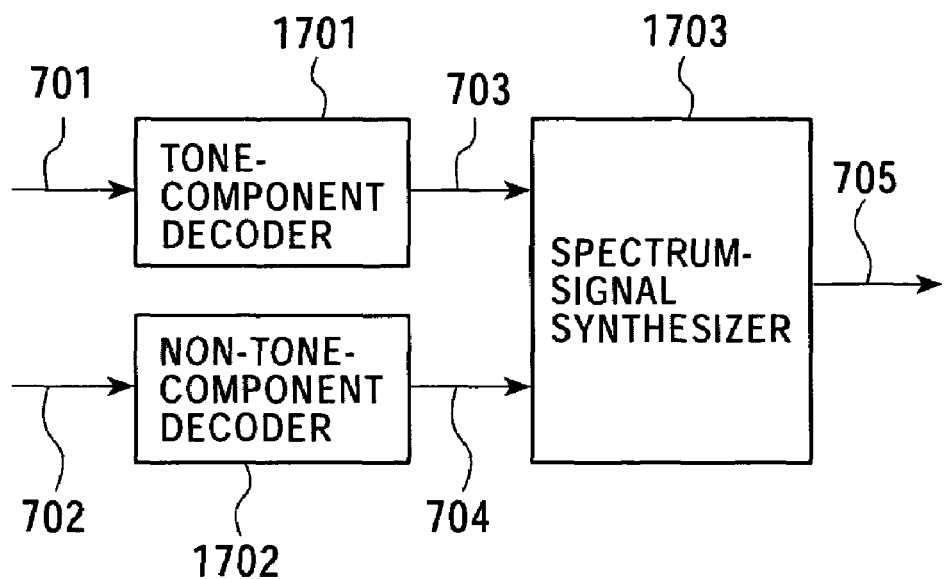
FIG. 12 is a block diagram illustrating another example of the signal-component decoder.

FIG. 12 illustrates the configuration of the signal-component decoder 1402 shown in FIG. 5 for decoding tone-component codes and non-ton-component codes. Signal components 701 and 702 are decoded into spectral signal components 703 and 704 by a tone-component decoder 1701 and a non-tone-component decoder 1702, respectively. The spectral signal components 703 and 704 are combined by a spectrum-signal synthesizer 1703 to generate a decoded signal 705.

Figure 13:
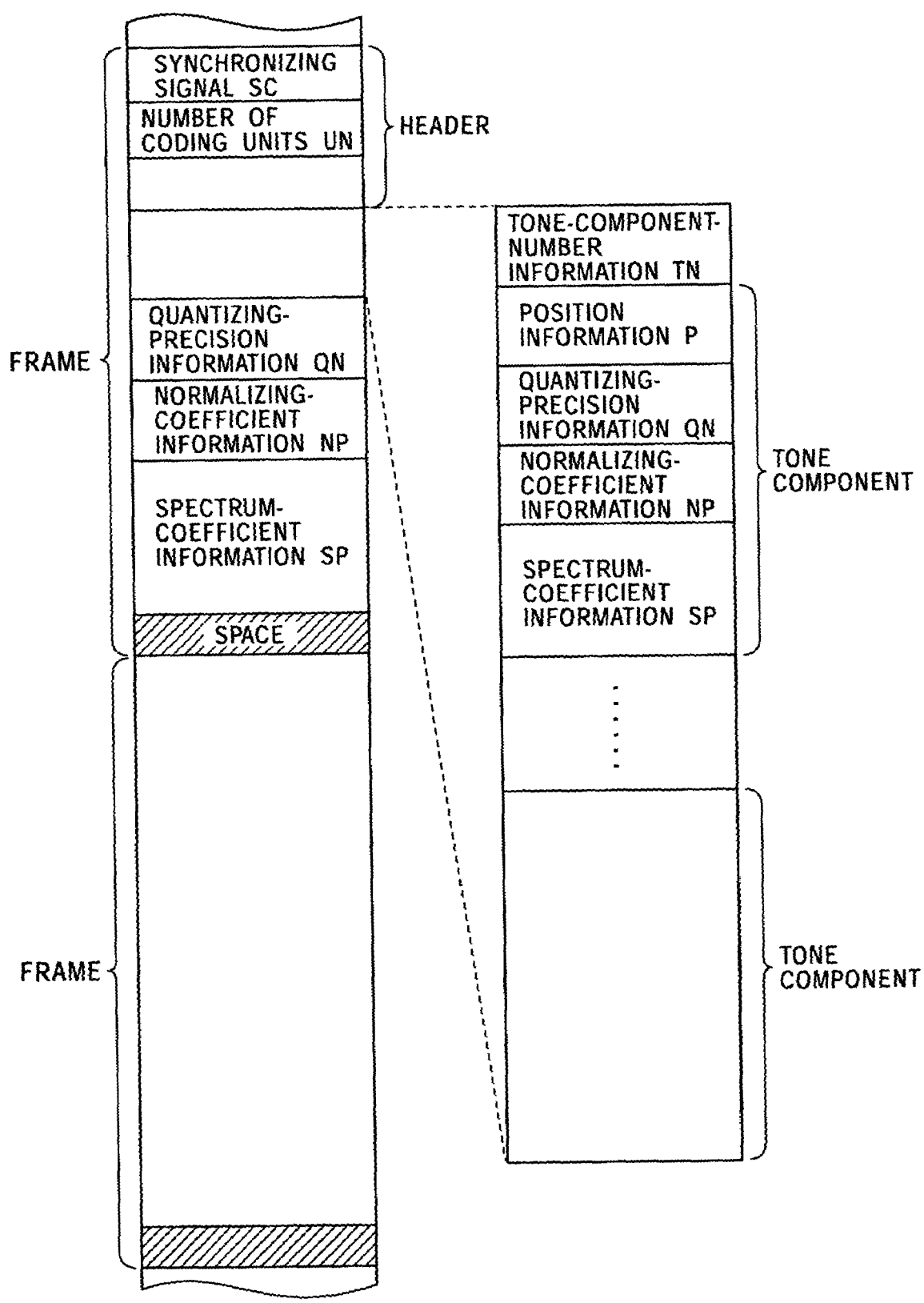
FIG. 13 illustrates still another coding method according to the present invention.

FIG. 13 illustrates an example of a recording medium on which the signal coded as described above is recorded. In this example, tone components are separated from the other components and are then coded, and a code string of the tone components is recorded between the header and the quantizing-precision information QN. In the tone component string, tone-component-number information TN is recorded, followed by the data of each tone component. The data of each tone component includes position information P, quantizing-precision information QN, normalizing-coefficient information NP, and spectrum-coefficient information SP. In this example, the transform block length is twice longer than that of the example shown in FIG. 9 so as to increase the frequency resolution. Also by using variable length codes, an acoustic-signal code string which is twice longer than that by the method shown in FIG. 9 is recorded in a frame having the same number of bytes as that of the example in FIG. 9.

Figure 14:
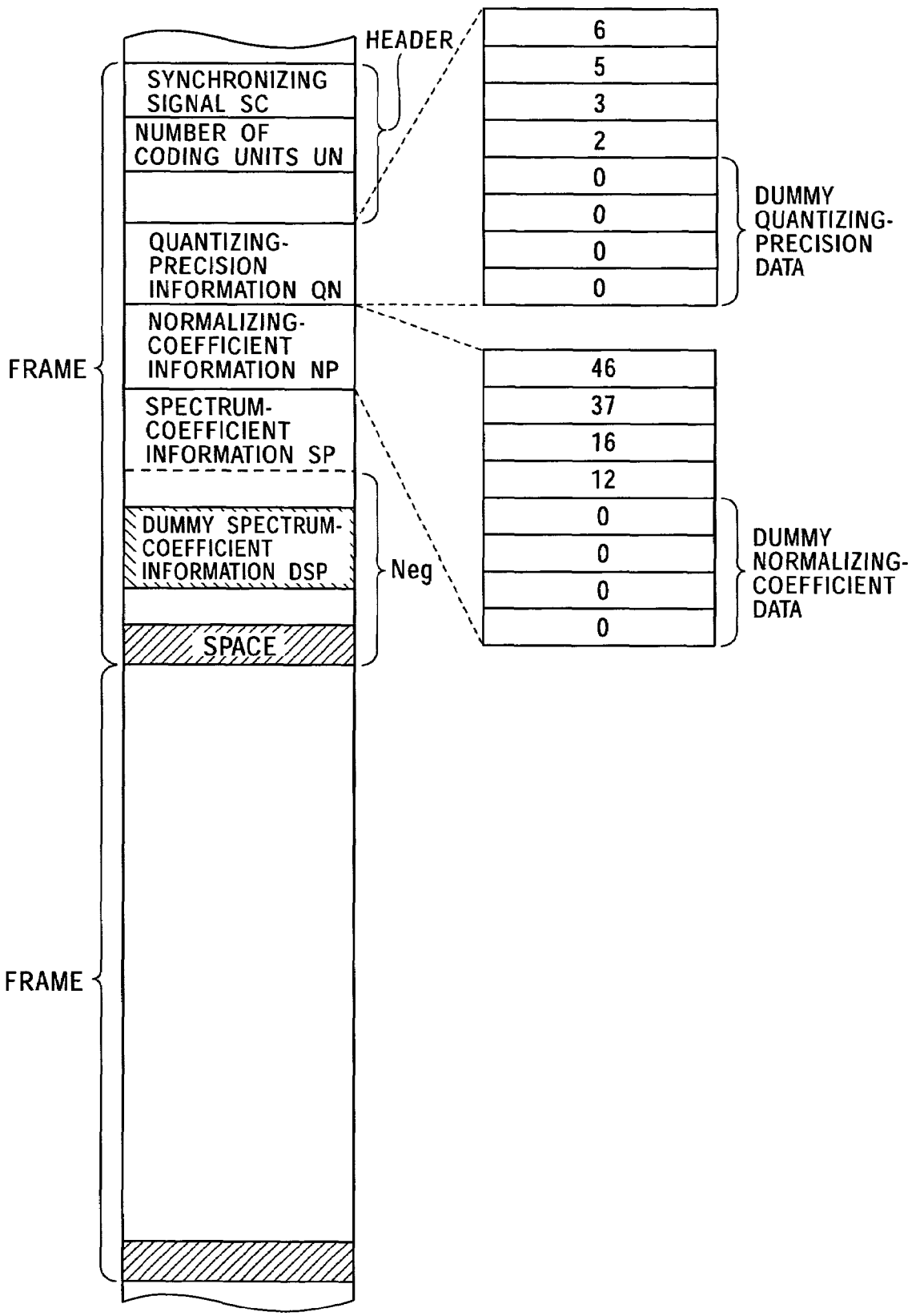
FIG. 14 illustrates another coding method according to the present invention.
Figure 15:
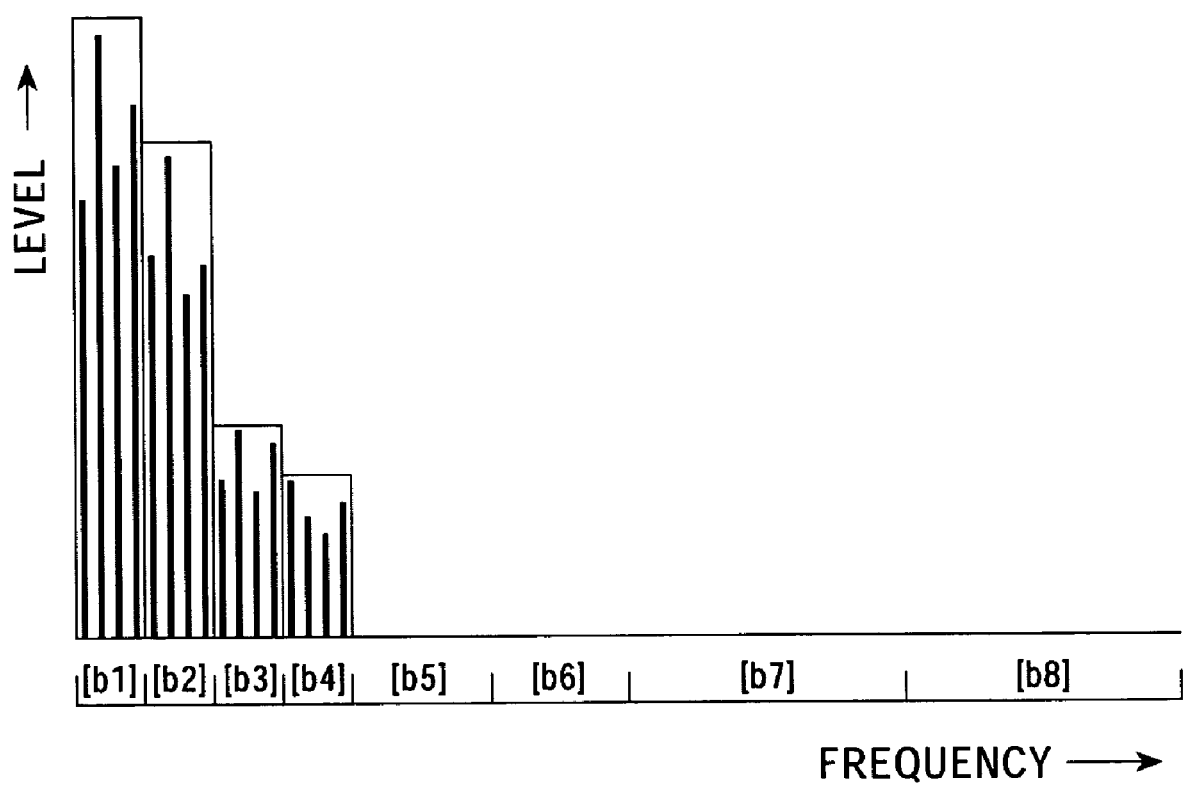
FIG. 15 illustrates another coding method according to the present invention.

International Publication No. WO02/065449 discloses a coding method shown in FIG. 14. Dummy quantizing precision data is filled in part of the quantizing precision information QN shown in FIG. 9. More specifically, 0 bits are assigned to the four higher-band coding units as the quantizing precision. Also, as dummy normalizing-coefficient data in the normalizing-coefficient information NP, the value 0, which is the minimum value, is assigned to the four higher-band coding units as the normalizing coefficient. In this example, the values used as the normalizing-coefficient information are proportional to the dB values. By setting the higher-band quantizing precision information to 0, an area Neg of the data coefficient information, and more specifically, the spectrum-coefficient information in the area Neg shown in FIG. 14, is ignored while the user previews or listens to the corresponding data. When such data is played back by a regular playback apparatus, narrow-band data having a spectrum shown in FIG. 15 is played back. As in the quantizing-precision information, dummy data is also filled in the normalizing-coefficient information, which makes it further difficult to illegally playback the high-quality data by predicting the quantizing-precision information from the normalizing-coefficient information.

In the example shown in FIG. 14, part of the spectrum data in the intermediate band indicated by the hatched portion is replaced by dummy data (dummy spectrum-coefficient information DSP), and thus, it is further difficult to illegally increase the quality of this preview file. In this method, the spectrum-coefficient information is coded from a lower band to a higher band by using variable length codes. Accordingly, by replacing the intermediate-band spectrum by dummy data, spectrum-coefficient information positioned in higher bands than the dummy data cannot be correctly read. While previewing such data, the sound in the intermediate band is muted by the dummy normalizing-coefficient information, and thus, noise is not heard.

Figure 16:
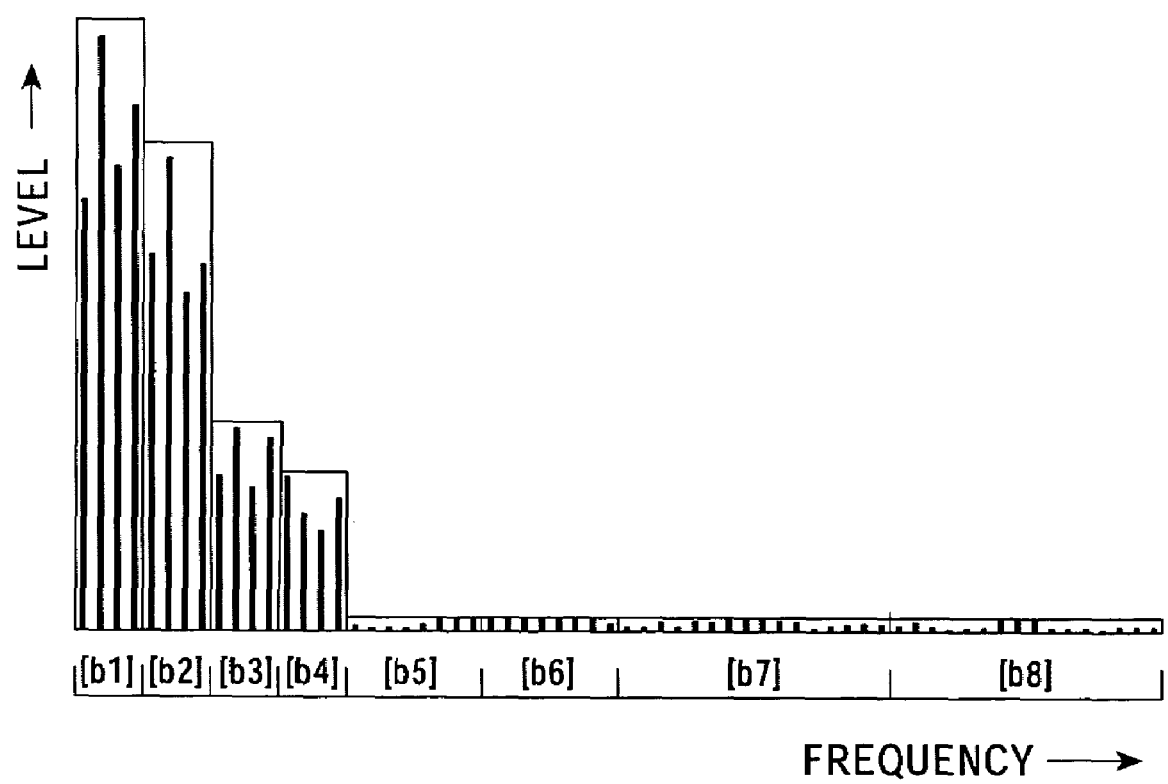
FIG. 16 illustrates another coding method according to the present invention.

Although in the above-described example both the quantizing-precision information and the normalizing-coefficient information are partially replaced by dummy data, dummy data may be used for only one item of the information. If only the quantizing-precision information is replaced by 0-bit dummy data, narrow-band data having a spectrum, such as that shown in FIG. 15, is played back. If only the normalizing-coefficient information is replaced by 0-bit dummy data, data having a spectrum, such as that shown in FIG. 16, is played back, in which case, higher bands do not become exactly 0. In terms of the audibility, however, it is almost the same as the spectrum in which higher bands are 0. Thus, in the present application, the spectrum shown in FIG. 16 is also included in a narrow-band signal.

A determination as to whether quantizing-precision information or normalizing-coefficient information is to be replaced by dummy data can be made by the possibility of true values being predicted. In terms of the security, the best is to replace both the quantizing-precision information and the normalizing coefficient information by dummy data since no data is then available for predicting the true values. If dummy data is used for only the quantizing-precision information, the possibility of quantizing-precision information being predicted from the normalizing-coefficient information becomes higher if the quantizing-precision information has been determined based on the normalizing coefficients according to a bit allocation algorithm. In contrast, it is relatively difficult to predict the normalizing coefficient information from the quantizing-precision information. Thus, if dummy data is used for only one of the normalizing-coefficient information and the quantizing-precision information, the normalizing-coefficient information is preferably replaced by dummy data in terms of the security. The quantizing-precision information and the normalizing-coefficient information may be selectively replaced by dummy data depending on the band.

Regardless of whether the quantizing-precision information or the normalizing-coefficient information is replaced by dummy data, it is difficult to predict a relatively large amount of data than to decipher a relatively short key used for normal encryption. Accordingly, for example, the possibility of protecting the copyright of music can be increased. Even if true values of a certain piece of music are predicted from dummy data, there is no danger of expanding such damage to other pieces of music, unlike when an encryption algorithm is deciphered. Thus, the above-described method achieves higher security than an encryption method.

Figure 17:
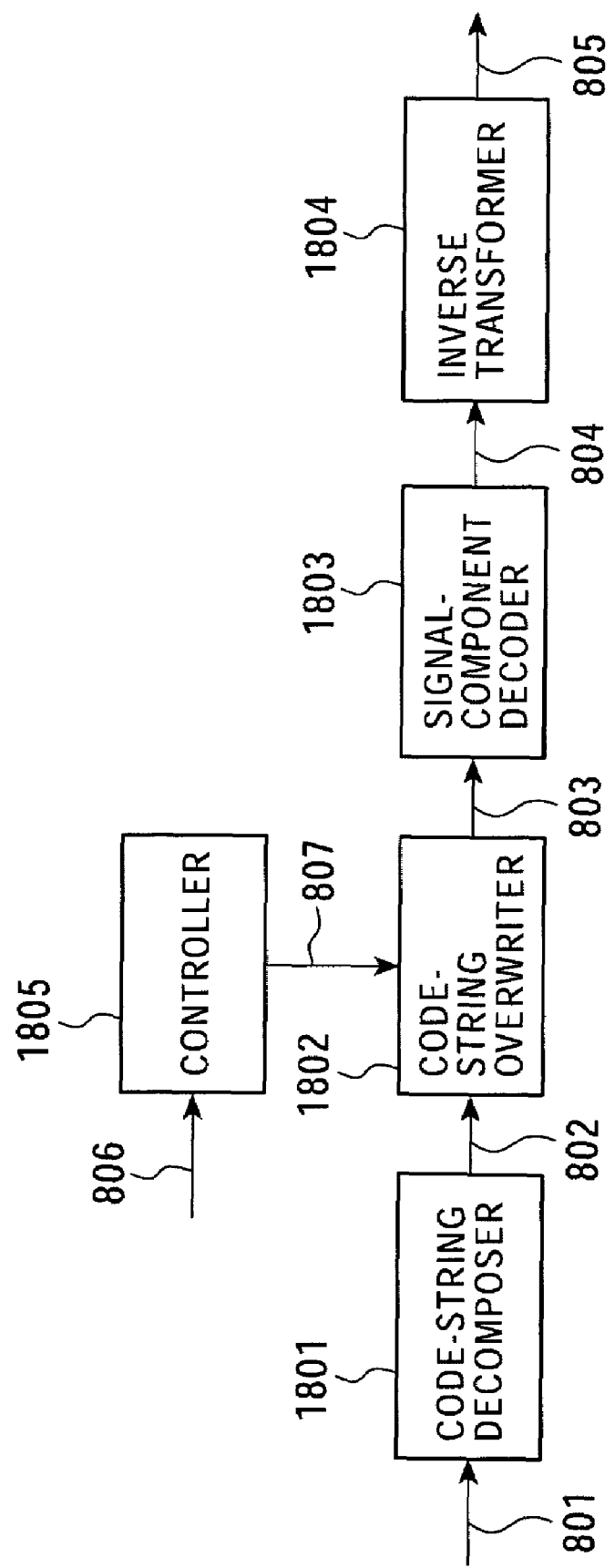
FIG. 17 is a block diagram illustrating a playback apparatus according to the present invention.

FIG. 17 is a block diagram illustrating an example of a playback apparatus employing the method disclosed in International Publication No. WO02/065449, and this playback apparatus is an improvement made on the decoding apparatus shown in FIG. 5. In FIG. 17, part of a code string 801 is replaced by dummy data, and more specifically, quantizing-precision information and normalizing-coefficient information in higher bands are replaced by dummy data. The code string 801 is decomposed by a code-string decomposer 1801, and resulting decomposed codes 802 are supplied to a code-string overwriter 1802. Upon receiving true quantizing-precision information and normalizing-coefficient information 806 from a controller 1805 as information 807, the code-string overwriter 1802 overwrites the dummy data by the true quantizing-precision information and normalizing-coefficient information 807, and supplies resulting data 803 to a signal-component decoder 1803. The signal-component decoder 1803 decodes the data 803 into spectrum data 804, and an inverse transformer 1804 transforms the spectrum data 804 into time-series data 805, thereby playing back a wide-band high-quality audio signal. It is desirable that the true quantizing-precision information and normalizing-coefficient information 806 be encrypted to increase the security.

Figure 18:
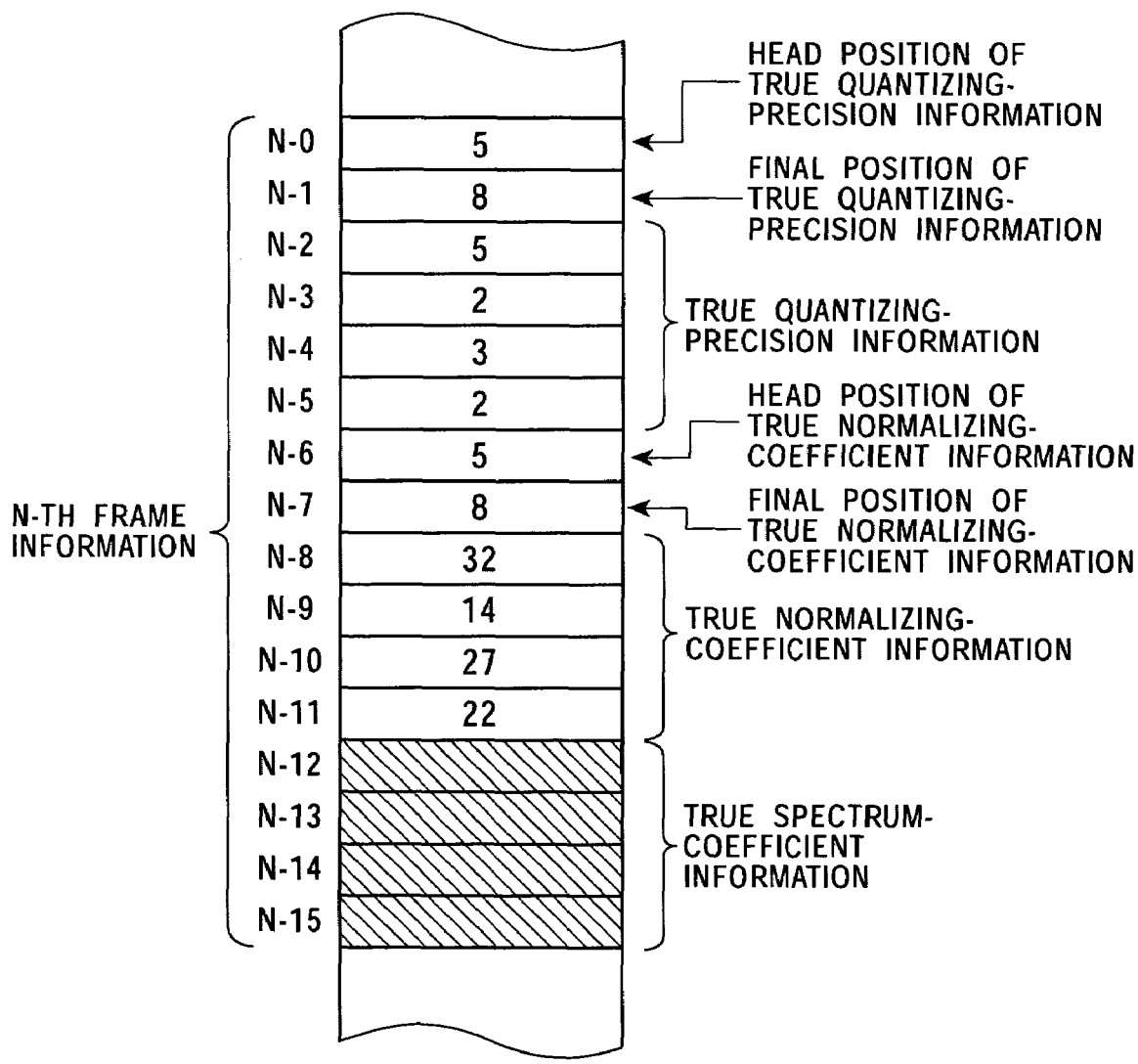
FIG. 18 illustrates an example of a format to replace dummy data.

FIG. 18 illustrates a specific example of the format of the true information 806 in FIG. 17. According to this format, the information of the N-th frame shown in FIG. 14 can be changed into the information shown in FIG. 9, so that a sound having the spectrum shown in FIG. 15 containing the dummy data is changed to a sound having the spectrum shown in FIG. 8. As stated above, the true information is preferably encrypted, and thus, it is now assumed that the true information is encrypted unless otherwise stated.

Figure 19:
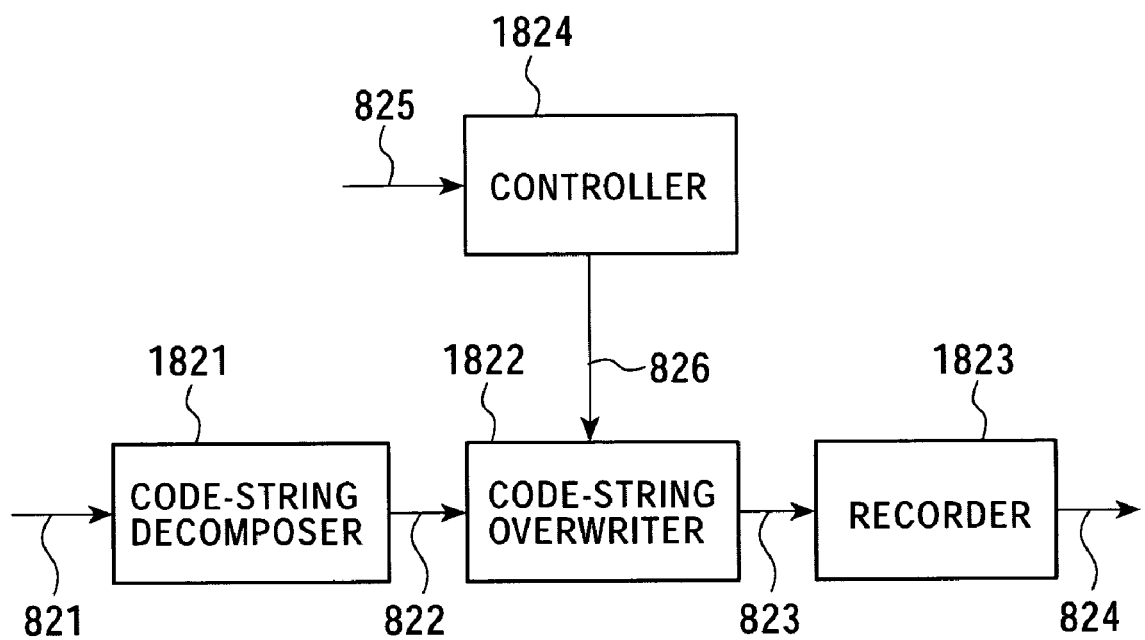
FIG. 19 is a block diagram illustrating a recording apparatus according to the present invention.

FIG. 19 is a block diagram illustrating a recording apparatus employing the method disclosed in International Publication No. WO02/065449. In FIG. 19, part of a code string 821 has been replaced by dummy data, and more specifically, quantizing-precision information and normalizing-coefficient information in higher bands have been replaced by dummy data. The code string 821 is first decomposed by a code-string decomposer 1821, and resulting decomposed codes 822 are supplied to a code-string overwriter 1822. Upon receiving true quantizing-precision information and normalizing-coefficient information 825 from a controller 1824 as information 826, the code-string overwriter 1822 overwrites the dummy data by the true quantizing-precision information and normalizing-coefficient information 826, and supplies resulting data 823 to a recorder 1823. The recorder 1823 records the data 823 in a recording medium as a code string 824. The recording medium which records the code string 824 therein may be the same recording medium in which the code string 821 has been recorded.

Figure 20:
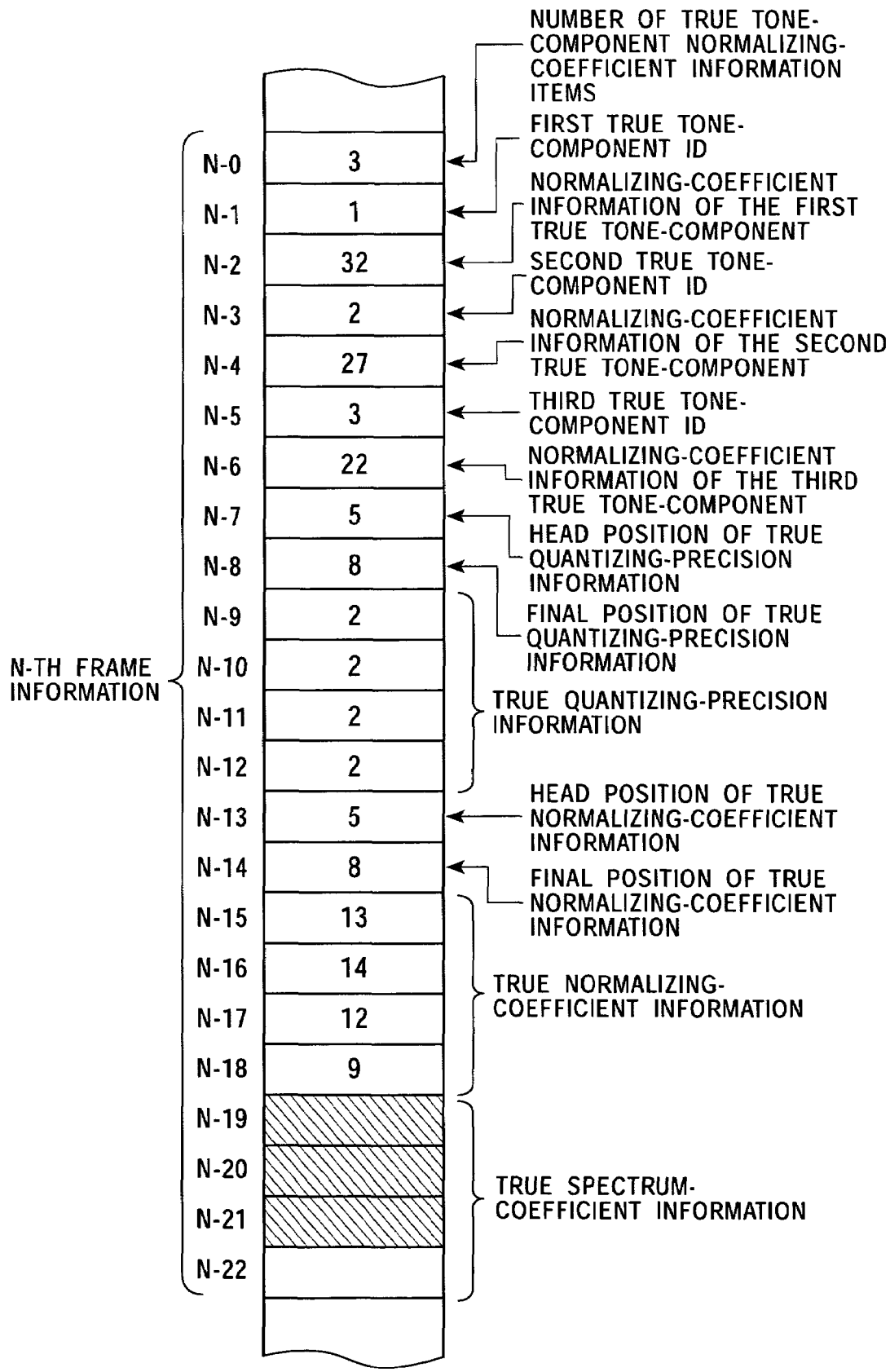
FIG. 20 illustrates another example of a format to replace dummy data.

FIG. 20 illustrates a specific example of the format of true information to replace dummy data when tone components are separated as shown in FIG. 10 and are coded as shown in FIG. 13. According to this format, a playback sound having the spectrum shown in FIG. 15 can be changed into a playback sound having the spectrum shown in FIG. 10. The format shown in FIG. 20 is an additional file for achieving a high-quality playback operation when tone components are separated and coded, and in the original preview file, dummy data having the magnitude of 0 is substantially stored in the normalizing-coefficient information of the tone components in higher bands.

The coding methods applicable to the present invention have been described. By applying one of the above-described coding methods to an audio recording/playback operation, relatively low-quality audio data can be freely previewed or listened to as a preview file, and high-quality audio data can be viewed or listened to by, for example, purchasing an additional file having a data amount smaller than the preview file.

The data amount of an additional file for achieving a high-quality playback operation can further be decreased, as disclosed in International Application No. PCT/JP03/04526 or Japanese Patent Application No. 2002-107084 (which was not published when the present application was filed).

By decreasing the data amount of an additional file, the time required for obtaining the additional data by communication means can be reduced, and also, the overall time for obtaining high-quality audio data after the user has decided to purchase it can also be decreased.

The method for reducing the data amount of an additional file is described below, assuming that tone components are not separated. However, to further develop such a method, tone components can be separated.

Figure 21:
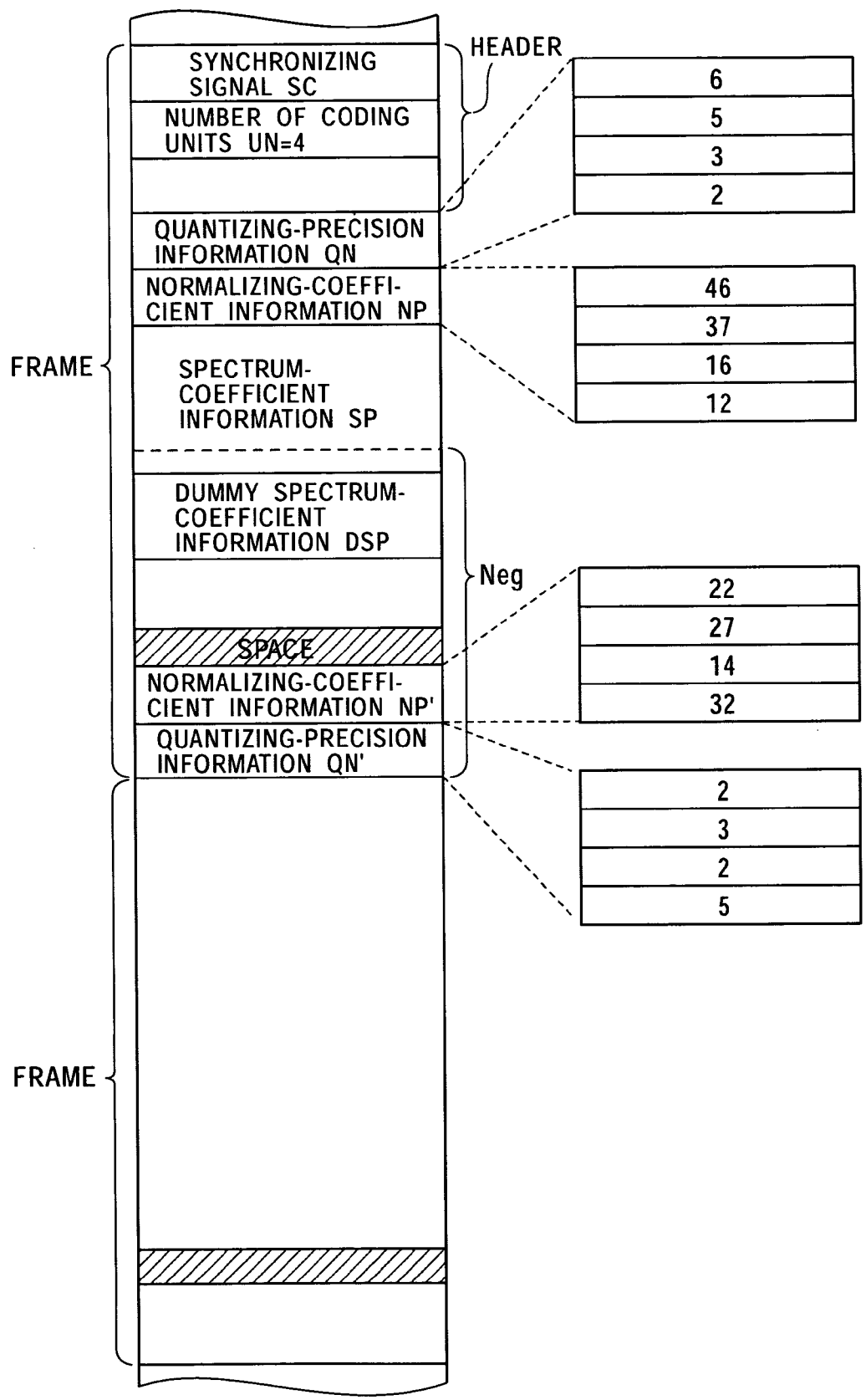
FIG. 21 illustrates another coding method according to the present invention.

FIG. 21 illustrates a specific example of the format of a code string of a preview file according to the method disclosed in International Application No. PCT/JP03/04526 or Japanese Patent Application No. 2002-107084. In this format, the number of coding units UN is designated as 4 (UN=4) in advance so that only narrow-band data is played back as the preview file. In a true format, only 4 items of data are coded as quantizing-precision information QN and normalizing-coefficient information NP. Accordingly, even if all the items of spectrum-coefficient information SP required for achieving a wide-band playback operation are coded, data (indicated by an area Neg), which has been coded after the spectrum-coefficient information corresponding to the four coding units, are ignored while playing back the preview file. From the end of each frame, quantizing-precision information QN' and normalizing-coefficient information NP' in higher bands, which have not been coded at the regular positions, are coded. Only the quantizing-precision information QN and the normalizing-coefficient information NP in lower bands are coded at the regular positions, and it is thus necessary to reserve an area for coding the above-described higher-band information. Additionally, variable-length codes are used for coding the spectrum-coefficient information, and part of the spectrum-coefficient information in the intermediate bands, which is ignored while playing back the preview data, is replaced by dummy data (dummy spectrum-coefficient information DSP).

In this example, for easily identifying the start position of a code string, the quantizing-precision information and the normalizing-coefficient information are sequentially coded from a lower band to a higher band from the end of the frame. Such information may be disposed in another order. However, particularly when the frame length is fixed, it is very convenient to specify the position of a code string if true data is coded from the end of the frame. Also in this example, part of the spectrum-coefficient information in the intermediate bands is replaced by dummy data, and this data is ignored while playing back the preview file, thereby preventing the occurrence of noise during the playback operation. In this example, variable-length codes are used for coding the spectrum-coefficient information. Accordingly, if intermediate-band data is unknown to the user, the spectrum-coefficient information higher than the intermediate-band data cannot be read, thereby making it possible to enhance the security.

Figure 22:
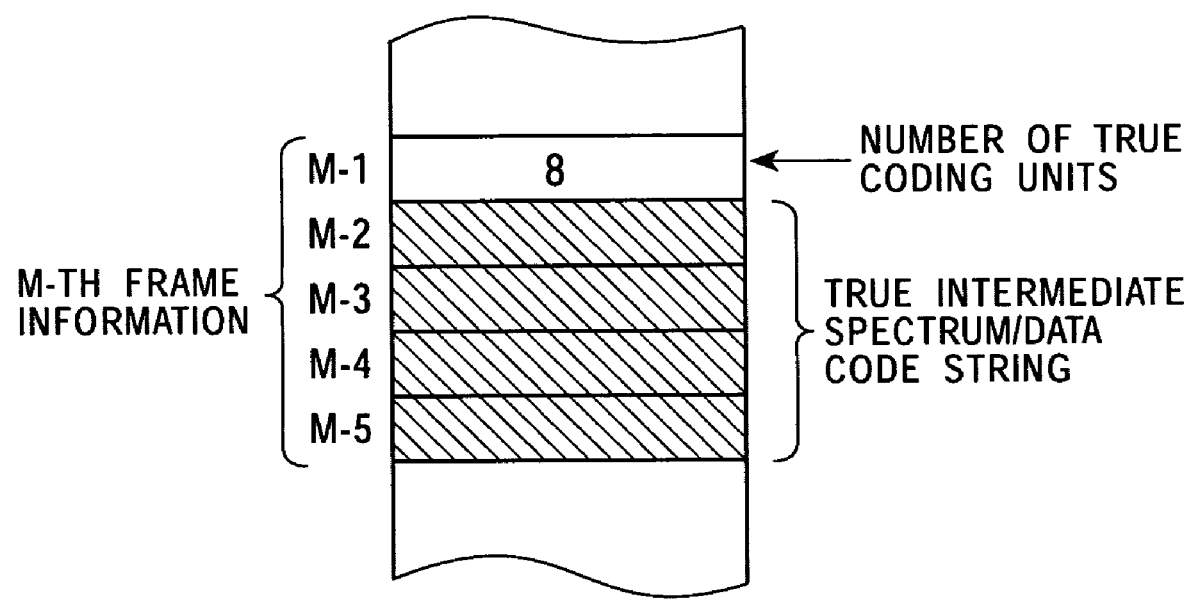
FIG. 22 illustrates an example of additional information for achieving a high-quality operation.

FIG. 22 illustrates a specific example of the format of one frame of an additional file for increasing the quality of the preview file shown in FIG. 21. In this example, the number of true coding units is recorded at the head of each frame, followed by true spectrum-coefficient information, which replaces the dummy spectrum-coefficient information in the intermediate bands.

Figure 23:
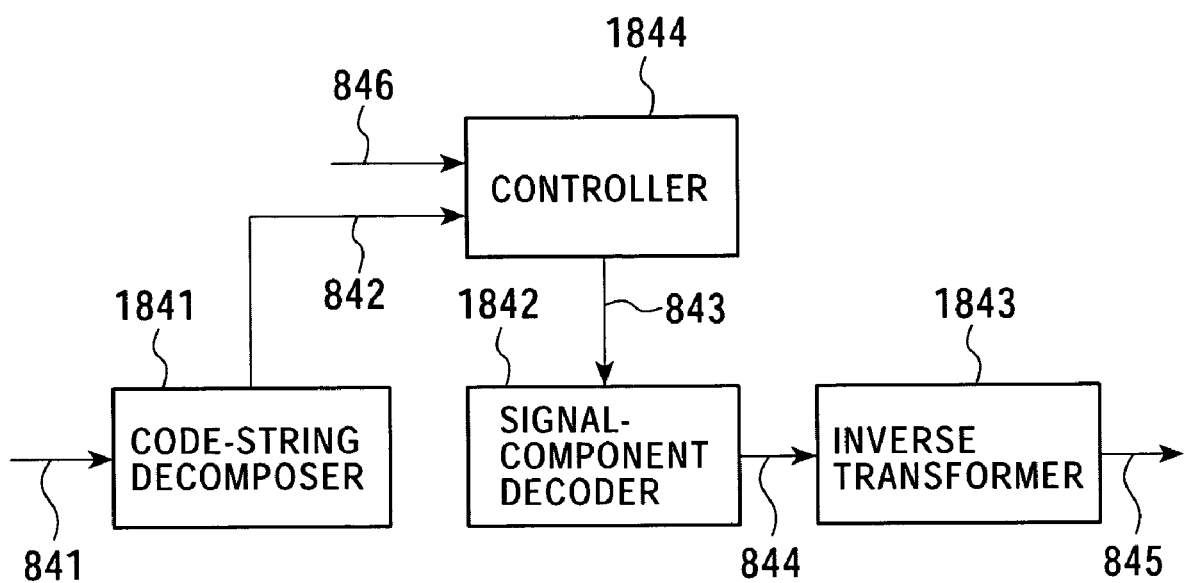
FIG. 23 is a block diagram illustrating another playback apparatus according to the present invention.

FIG. 23 is a block diagram illustrating a playback apparatus employing the method disclosed in International Application No. PCT/JP03/04526 or Japanese Patent Application No. 2002-107084. In FIG. 23, part of a code string 841 has been replaced by dummy data, and more specifically, the number of coding units and intermediate-band spectrum-coefficient information have been replaced by dummy data. The code string 841 is first decomposed into codes 842 by a code-string decomposer 1841, and the codes 842 are supplied to a controller 1844. A code string 846 having the format shown in FIG. 22 is also supplied to the controller 1844, and the controller 1844 generates a wider-band code string 843 from the code string 846 and the codes 842, and sends the code string 843 to a signal-component decoder 1842. The signal-component decoder 1842 decodes the code string 843 into spectrum data 844, and an inverse transformer 1843 transforms the spectrum data 844 into time-series data 845, thereby playing back a wide-band high-quality audio signal.

Figure 24:
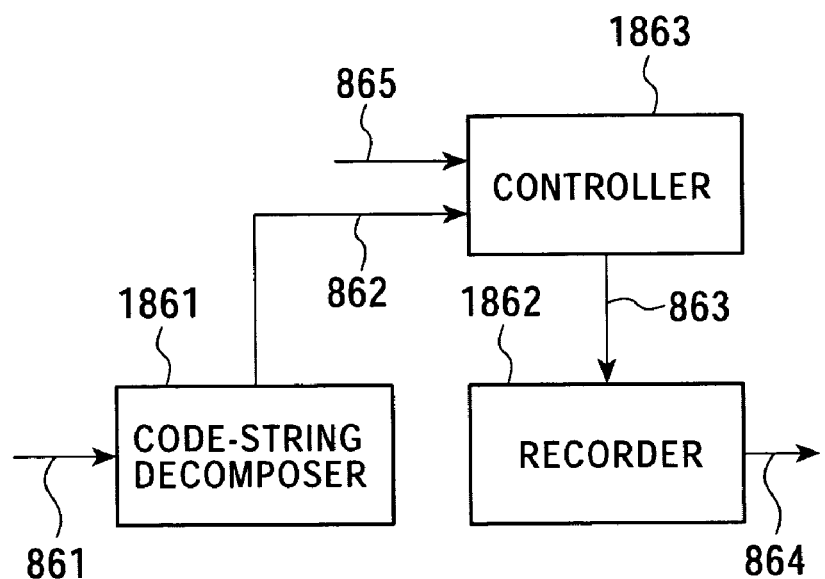
FIG. 24 is a block diagram illustrating another recording apparatus according to the present invention.

FIG. 24 is a block diagram illustrating a recording apparatus employing the method disclosed in International Application No. PCT/JP03/04526 or Japanese Patent Application No. 2002-107084. In FIG. 24, part of a code string 861 has been replaced by dummy data, and more specifically, the number of coding units and intermediate-band spectrum-coefficient information have been replaced by dummy data. The code string 861 is decomposed into codes 862 by a code-string decomposer 1861, and the codes 862 are supplied to a controller 1863. A code string 865 having the format shown in FIG. 22 is also supplied to the controller 1863, and the controller 1863 generates a wider-band code string 863 from the code string 865 and the codes 862, and sends the code string 863 to a recorder 1862. The recorder 1862 records the code string 863 in a recording medium. The recording medium recording the code string 864 therein may be the same recording medium in which the code string 861 has been recorded.

Figure 25:
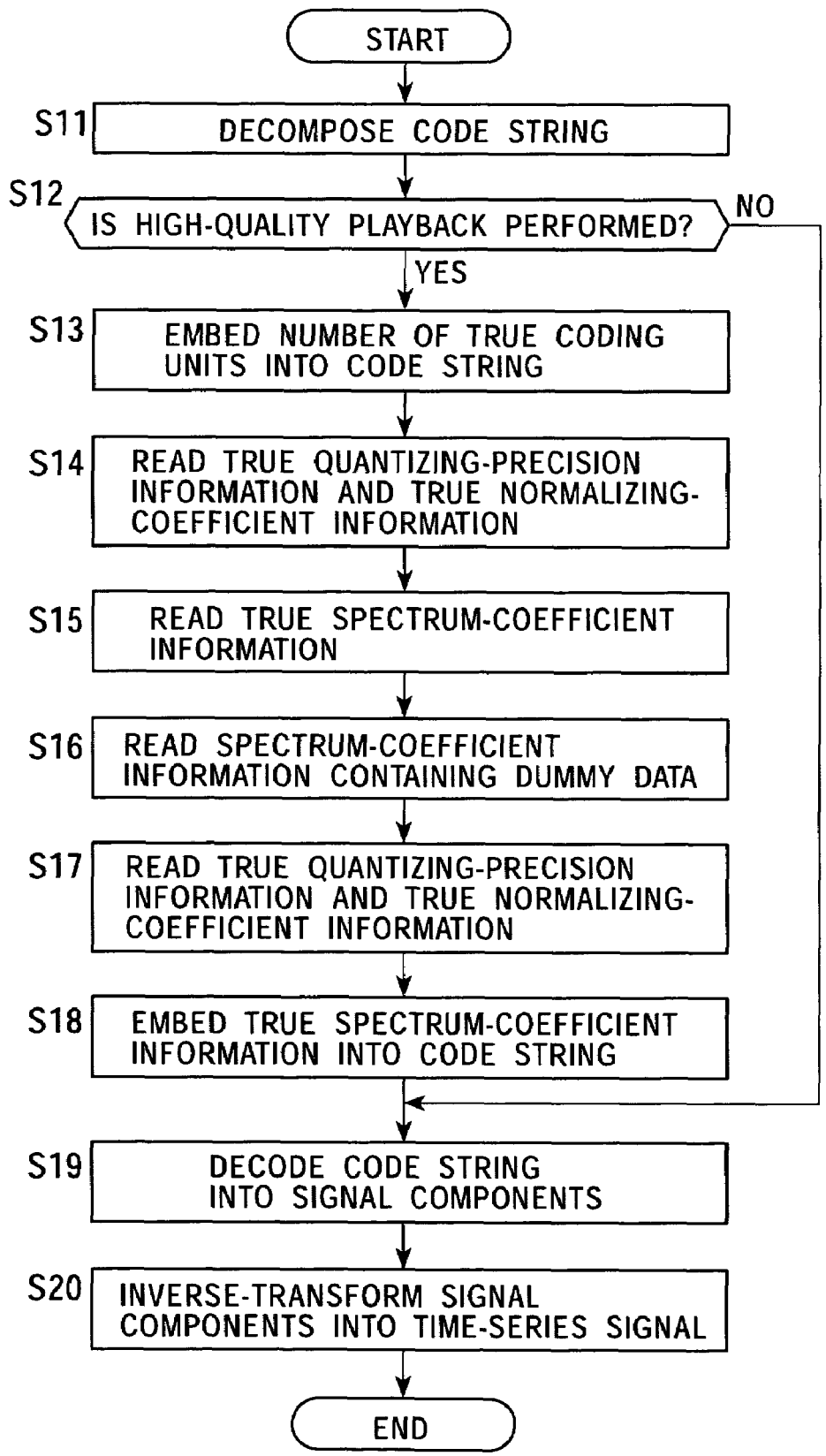
FIG. 25 is a flowchart illustrating a playback method according to the present invention.

FIG. 25 is a flowchart illustrating a playback operation employing the above-described method by using software.

In step S11, a code string containing dummy data is decomposed. Then, it is determined in step S12 whether a high-quality playback operation is to be performed. If the outcome of step S12 is yes, the process proceeds to step S13 in which the number of true coding units is embedded into the code string. If a high-quality playback operation is not performed, the process proceeds to step S19. In step S14, true quantizing-precision information and true normalizing-coefficient information are read. Then, in step S15, true spectrum-coefficient information is read. Subsequently, in step S16, spectrum-coefficient information containing dummy data is read, and then, in step S17, the true quantizing-precision information and the true normalizing-coefficient information are embedded into the code string. Thereafter, in step S18, true spectrum-coefficient information is generated from the information read in steps S15 and S16, and is then embedded into the code string from the position subsequent to the position of the true quantizing-precision information and the true normalizing-coefficient information. In step S19, the resulting code string is decoded into signal components, and in step S20, the decoded signal components are transformed into a time-series signal. The processing is then completed.

Figure 26:
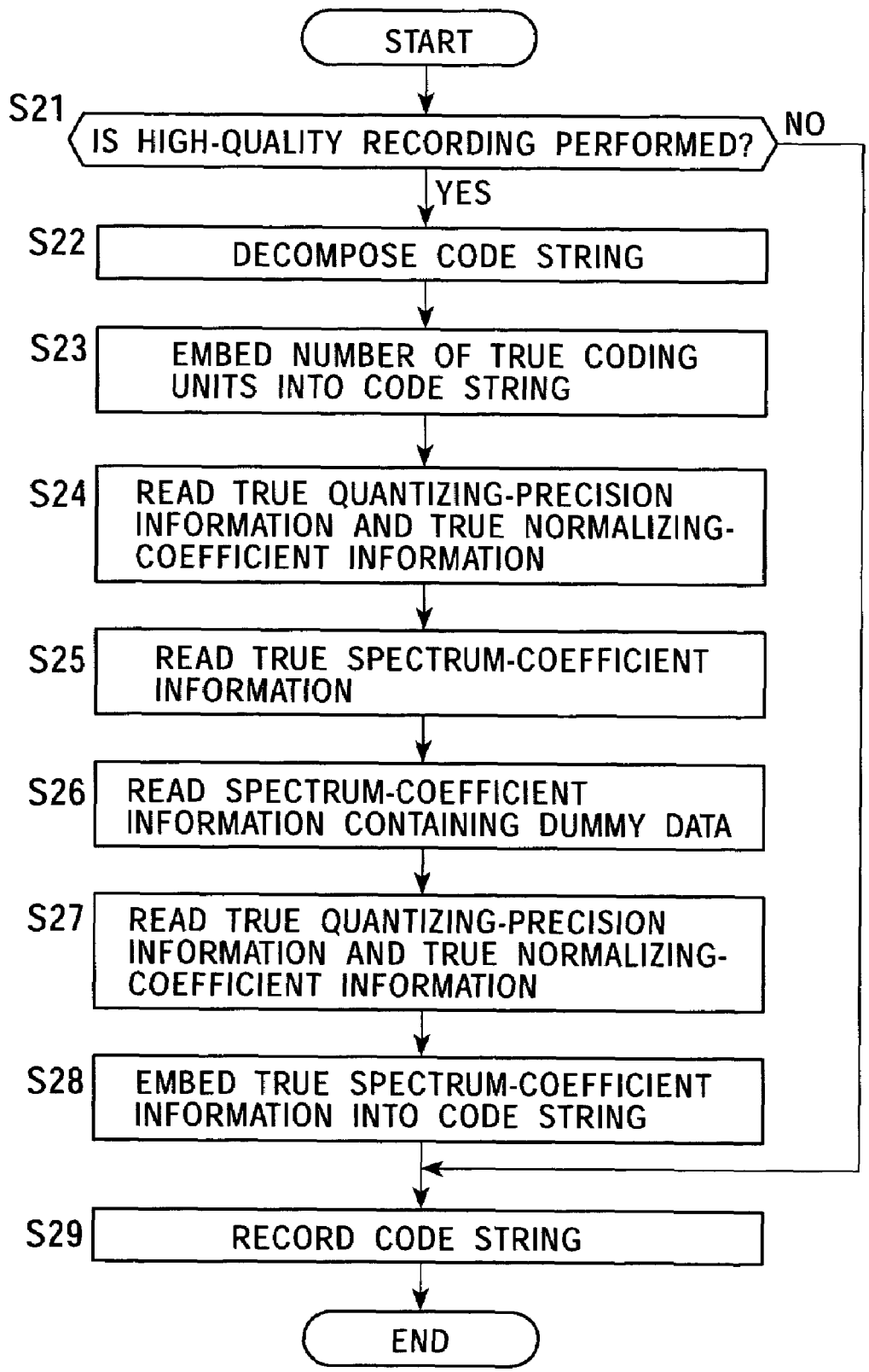
FIG. 26 is a flowchart illustrating a recording method according to the present invention.

FIG. 26 is a flowchart illustrating a recording operation employing the above-described method by using software.

In step S21, it is determined whether a high-quality recording operation is to be performed. If the outcome of step S21 is yes, the process proceeds to step S22 in which a code string containing dummy data is decomposed. If a high-quality recording operation is not performed, the process proceeds to step S29. In step S23, the number of true coding units is embedded into a code string. In step S24, true quantizing-precision information and true normalizing-coefficient information are read. Then, in step S25, true spectrum-coefficient information is read. Subsequently, in step S26, spectrum-coefficient information containing dummy data is read, and then, in step S27, the true quantizing-precision information and the true normalizing-coefficient information are embedded into the code string. Thereafter, in step S28, true spectrum-coefficient information is generated from the information read in steps S25 and S26, and is then embedded into the code string from the position subsequent to the position of the true quantizing-precision information and the true normalizing-coefficient information. In step S29, the resulting code string is recorded. The processing is then completed.

Figure 27:
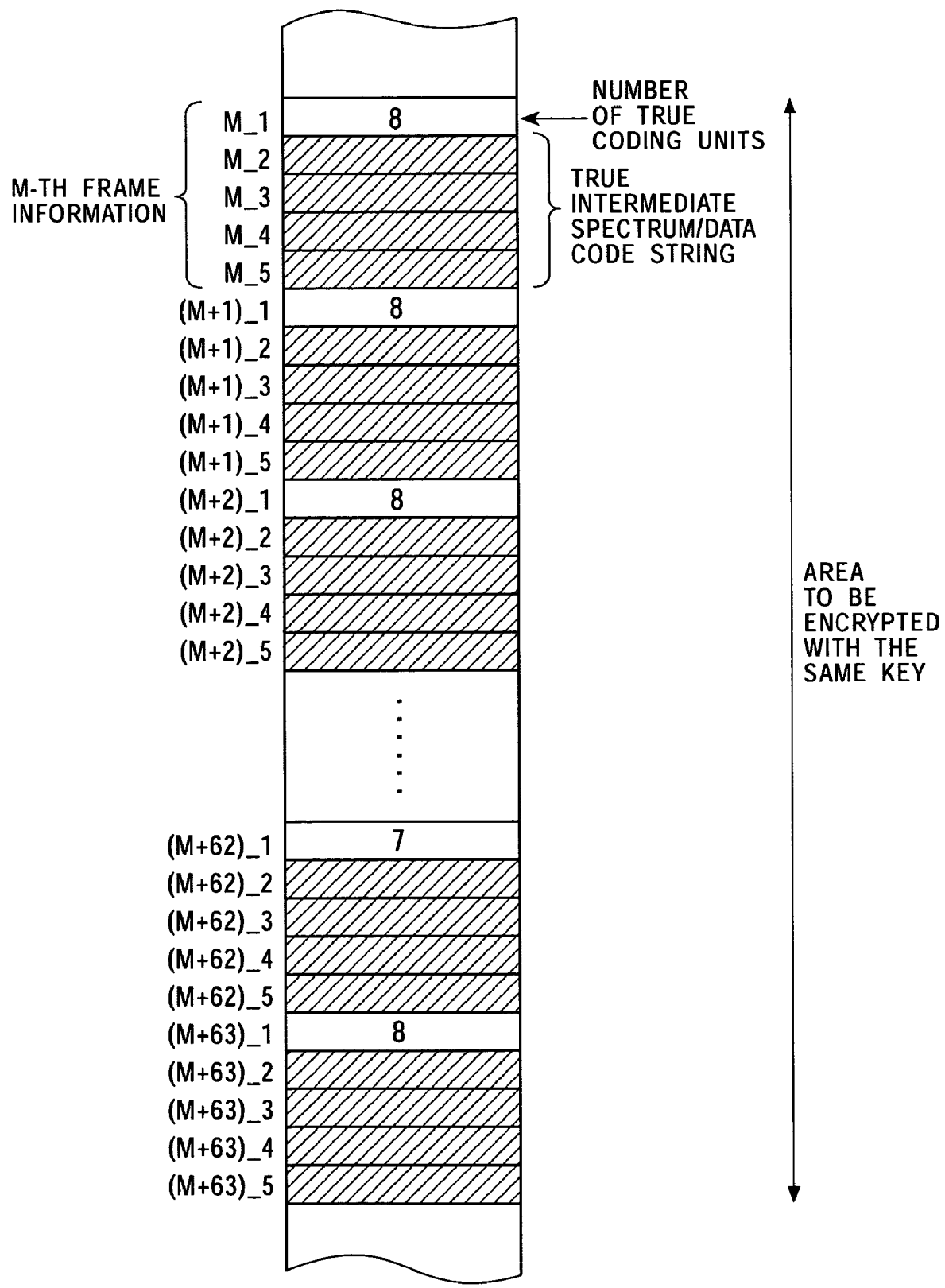
FIG. 27 illustrates an example of an encryption method for a code string indicating additional information for achieving a high-quality operation.

FIG. 27 illustrates an example of data obtained by the above-described method when a high-quality file is encrypted in units of 64 frames with a single key. As stated above, if the bandwidth is frequently changed in each frame, such a change becomes noticeable as noise. Accordingly, in many frames, the number of coding units is set to be the same. There are however exceptional cases in which the number of coding units changes, and thus, data of such exceptional cases cannot be ignored. In the example in FIG. 27, the number of true coding units in the (M+62)-th frame is 7, and that of the other frames is 8. Accordingly, when decrypting key information, there are very few cases in which the number of coding units is almost the same. Thus, candidates of the correct key can be limited to a very small number, and it is relatively easy to select a true high-quality file from such candidates.

Figure 28:
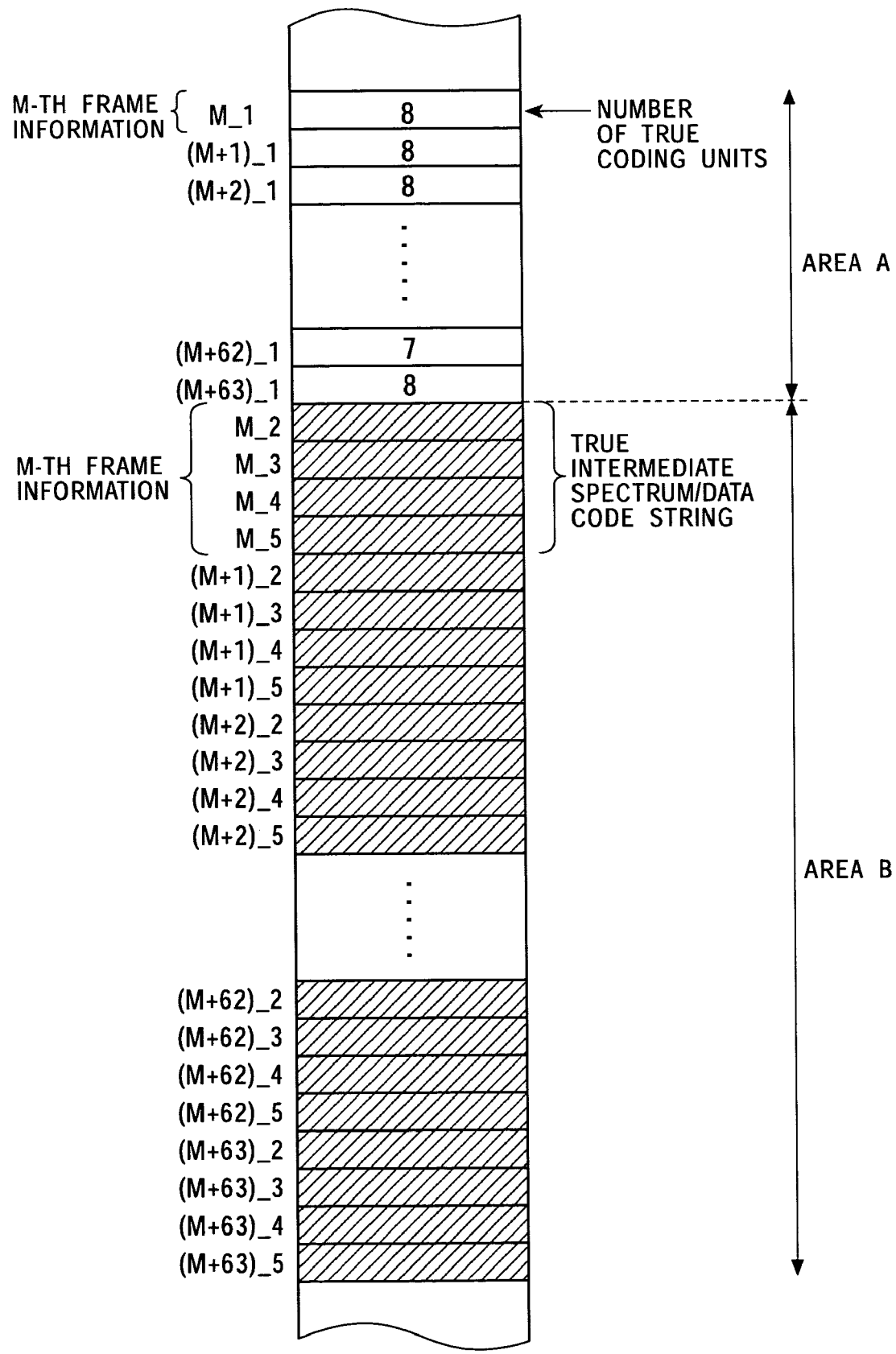
FIG. 28 illustrates another example of an encryption method for a code string indicating additional information for achieving a high-quality operation.

FIG. 28 illustrates a specific example of a method for encrypting a high-quality file according to the present invention in order to overcome this drawback. In the example in FIG. 28, information items indicating the number of true coding units having almost the same value are arranged together in area A, and information items indicating true intermediate-band spectrum/data code strings having random values are arranged together in area B. Then, the data in area B is encrypted, and the data in area A is subjected to an encryption whose type is different from that for area B. Alternatively, the data in area A is not encrypted. With this arrangement, although the possibility of the data recorded in area A being deciphered is high, the true data in area B have random values, and thus, it is difficult for a dishonest user to decipher the true data unless the user attempts to perform a very impractical method, for example, by listening to all the sounds which can be candidates of the true data. High security can thus be guaranteed. The data format in area A can be indicated by a short code, for example, by coding a frame number having an exceptional number of coding units, the data of such a number of coding units, and the data indicating the number of coding units of the other frames.

Although in this example the information of the number of true coding units is coded as part of the high-quality file, it may be coded in an area, which can be ignored by a decoder, of a code string of each frame of the original preview file. In this case, to reserve such an area, the number of bits used for coding the corresponding frame with high quality is reduced by the information for the number of coding units. The method of the present invention also encompasses such a modification.

The present inventors have proposed a method for performing a recording/playback operation by changing part of a first code string containing dummy data based on a second code string (high-quality file), as disclosed in Japanese Patent Application No. 2002-146731 (which was not published when this application was filed). In this method, true data that replaces dummy data in the first code string is embedded in only part of the frames of the first code string.

According to this method, the data amount of the second code string (high-quality file) can be reduced while maintaining a high level of security. The method of the present invention can be applied to such a method.

Figure 29:
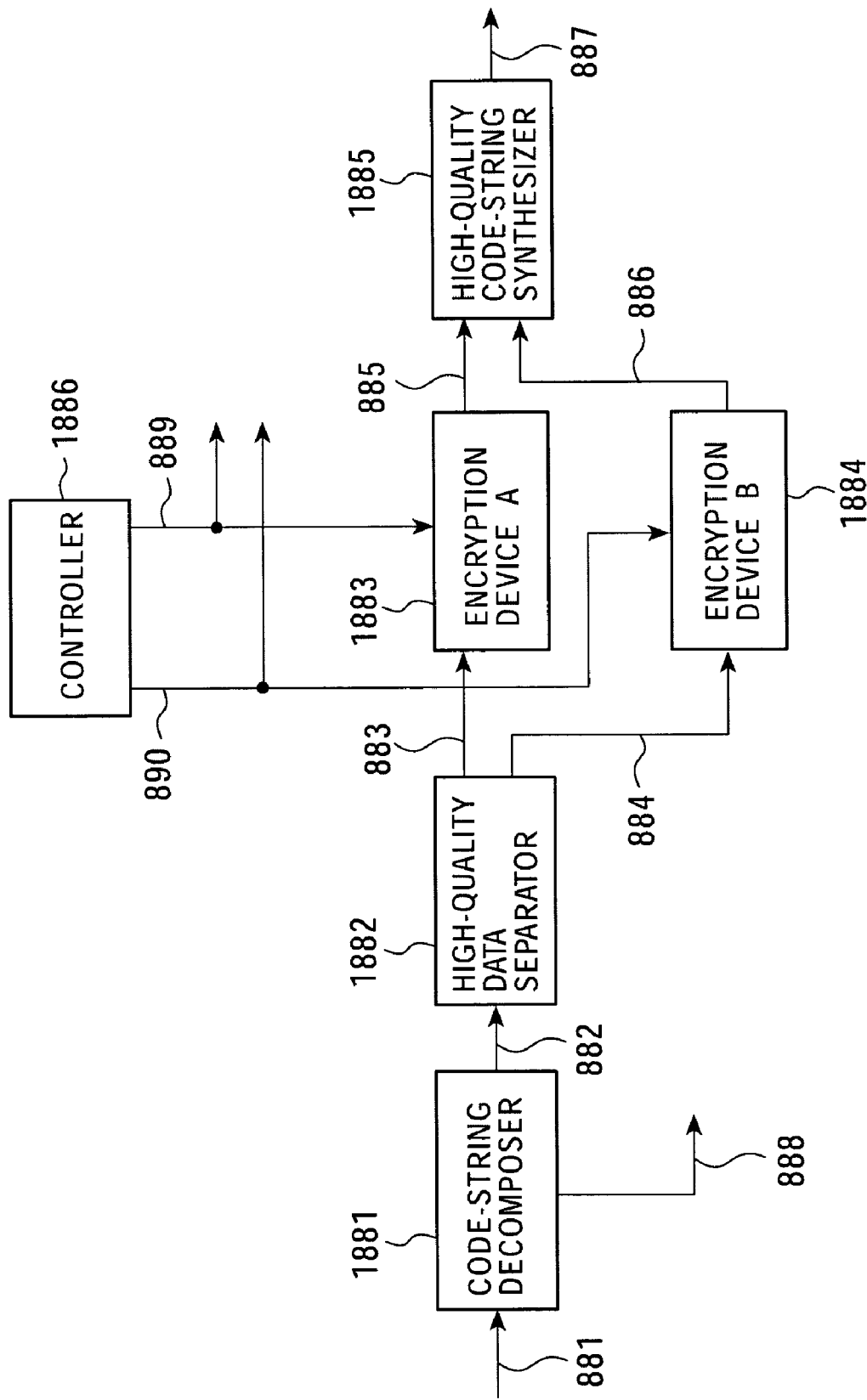
FIG. 29 is a block diagram illustrating a signal processor for decomposing a code string achieving a high-quality playback operation into a preview file and an encrypted high-quality file.

FIG. 29 is a block diagram illustrating a signal processor for decomposing a high-quality code string into a preview file and a high-quality file according to the method of the present invention. In this signal processor, a code-string decomposer 1881 decomposes a high-quality code string 881 into a preview file 888 and high-quality data 882. The high-quality data 882 is then supplied to a high-quality data separator 1882, and is separated into code string portions 883 having almost a regular pattern, and other code string portions 884. The code string portions 884 are supplied to an encryption device B 1884 and are encrypted by using a key 890 for encrypting a set of frames, the key 890 being generated by a controller 1886. An encrypted code string 886 is then supplied to a high-quality code-string synthesizer 1885.

Meanwhile, the code string portions 883 having almost a regular pattern are supplied to an encryption device A 1883, and are encrypted by using a key 889 different from the key 890 used in the encryption device B 1884, the key 889 also being generated by the controller 1886. An encrypted code string 885 is supplied to the high-quality code-string synthesizer 1885. As stated above, however, the encryption device A 1883 may be omitted, and the code string portions 883 having almost a regular pattern may be supplied to the high-quality code-string synthesizer 1885 as plaintext. The high-quality code-string synthesizer 1885 combines the code strings 885 and 886 to create a high-quality file 887, such as that shown in FIG. 28. The keys 889 and 890 are sent to a server for the high-quality file.

Figure 30:
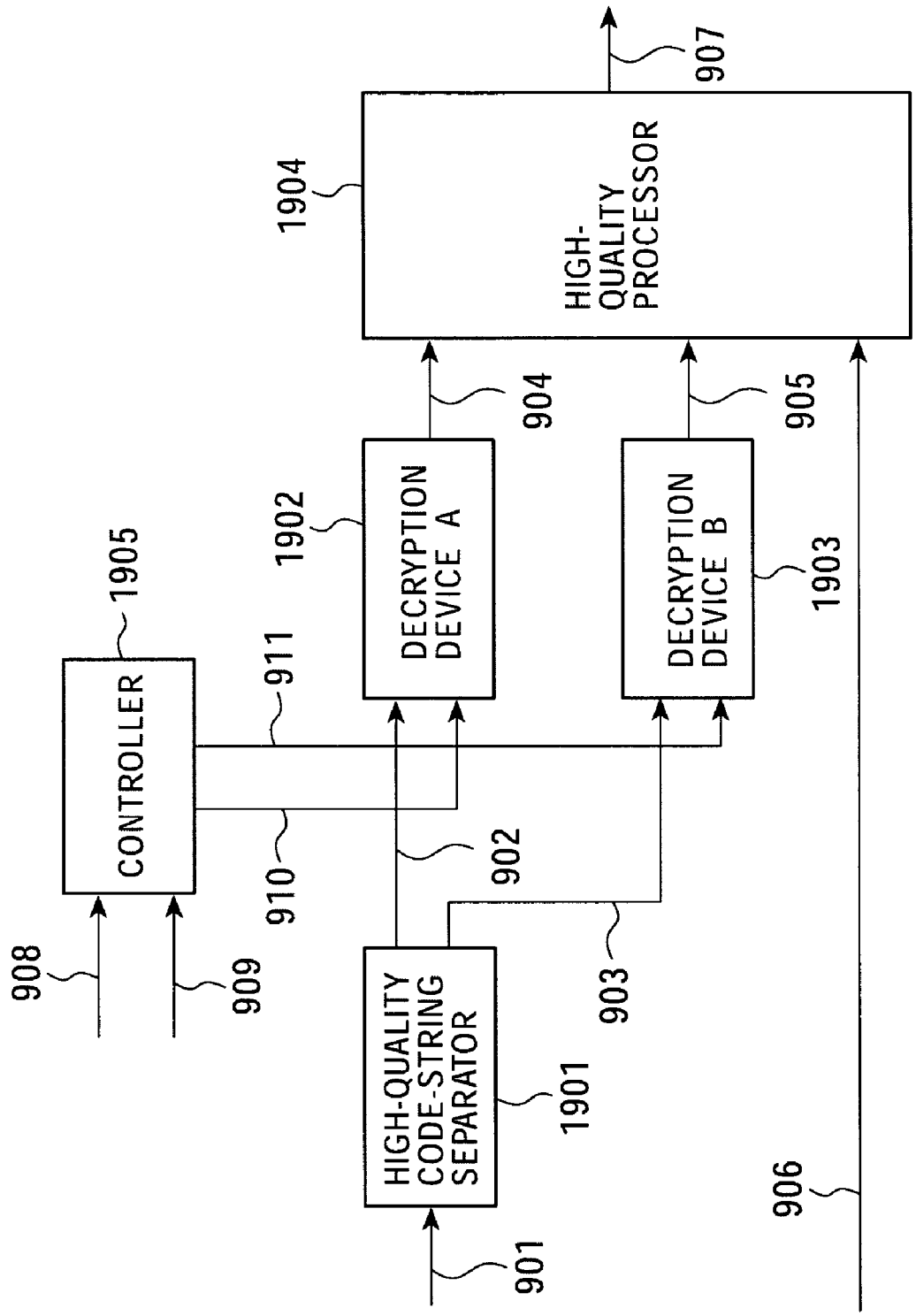
FIG. 30 is a block diagram illustrating a signal processor for generating a code string achieving a high-quality playback operation from a preview file and an encrypted high-quality file.

FIG. 30 is a block diagram illustrating a signal processor for outputting high-quality audio data from the preview file, the encrypted high-quality file, and the corresponding keys, which are output from the signal processor shown in FIG. 29. Data 901, which is equivalent to the high-quality file 887 in FIG. 29, is input into a high-quality code-string separator 1901. The high-quality code-string separator 1901 then separates the data 901 into encrypted code-string portions 902 having almost a regular pattern and other code-string portions 903. The other code-string portions 903 are decrypted in a decryption device B 1903 with a key 911, which corresponds to the key 890 used in the encryption device B 1884. A resulting code string portion 805 is supplied to a high-quality processor 1904. Meanwhile, the code-string portions 902 having almost a regular pattern are supplied to a decryption device A 1902, and are decrypted with a key 910, which corresponds to the key 889 used in the encryption device A 1883 in FIG. 29. A resulting code string 904 is then supplied to the high-quality processor 1904.

However, if the encryption device A 1883 is omitted, the code-string portions 902 are not encrypted. In this case, the decryption device A 1902 is omitted, and the code-string portions 902 are directly input to the high-quality processor 1904 as the code string 904. A code string 906, which is equivalent to the preview file 888 shown in FIG. 29, is input into the high-quality processor 1904. Thus, the code string 906 is processed into a high-quality code string 907 by using the code strings 904 and 905.

For sending and receiving the decryption keys 910 and 911 between the server for a high-quality file and the high-quality processor 1904, the following known processing can be performed, assuming that a common private key and a random-number generator are provided for the two elements. The server first generates a random number, encrypts it with a private key shared with the high-quality processor 1904 by using DES, and then sends the encrypted random number to the high-quality processor 1904. Then, the high-quality processor 1904 decrypts the random number by using the private key, encrypts the value obtained by adding one to the decrypted value by using the private key according to DES, and sends the encrypted value to the server. The server then decrypts the encrypted value received from the server to check whether the decrypted value is one greater than the random number generated by the server. If this verification succeeds, the server determines that the high-quality processor 1904 is an authenticated device that possesses the correct private key. Subsequently, the above-described verification is performed by changing roles, that is, the high-quality processor 1904 checks whether the server is an authenticated device.

After verifying authentication of both the high-quality processor 1904 and the server, the high-quality processor 1904 generates a random number R, encrypts the random number R with, for example, the random number that was previously sent to the server, according to DES, and sends the encrypted random number R to the server. The server then decrypts the random number R, and sends a key to encrypt a high-quality file by using the random number R as a key to the high-quality processor 1904. If there are a plurality of keys to encrypt the high-quality file, such keys may be repeatedly sent by varying the value of the random number R. In the above-described example, the private key is stored in a highly secure ROM in the controller 1905, and the controller 1905 contains a built-in random-number generator. Also in the server, the private key is highly secure, and the server has a built-in random-number generator.

Figure 31:
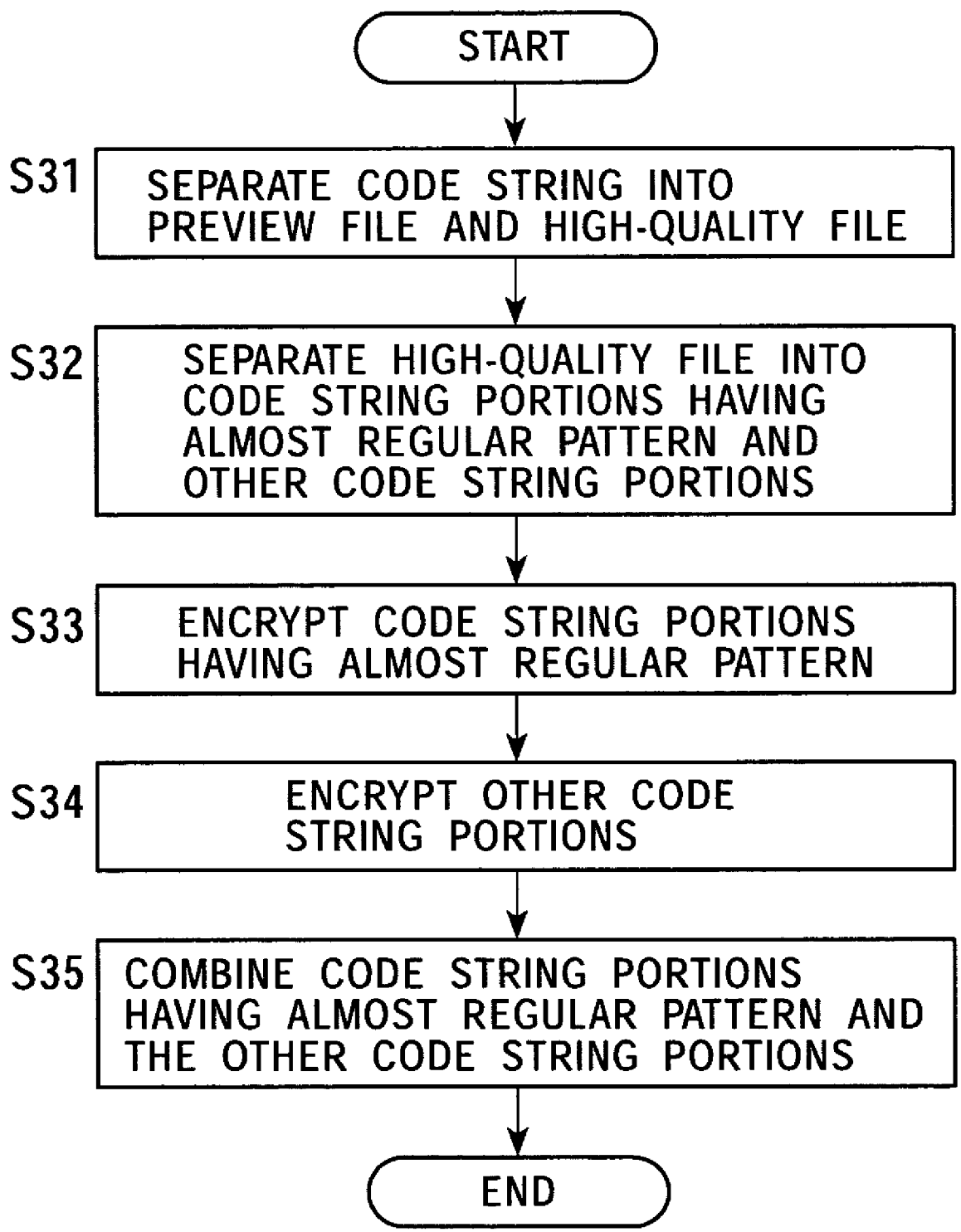
FIG. 31 is a flowchart illustrating signal processing for decomposing a code string achieving a high-quality playback operation into a preview file and an encrypted high-quality file.

FIG. 31 is a flowchart illustrating a signal processing method for decomposing a code string, which can be played back with high quality, into a preview file and an encrypted high-quality file. In step S31, the code string is first decomposed into a preview file and a high-quality file. Then, in step S32, the high-quality file is separated into code string portions having almost a regular pattern and other code string portions. In step S33, the code string portions having almost a regular pattern are encrypted, and in step S34, the other code string portions are encrypted. Subsequently, in step S35, the code string portions having almost a regular pattern encrypted in step S33 and the other code string portions encrypted in step S34 are combined to create a high-quality file. The processing is then completed. Step S33 may be omitted, in which case, in step S35, unencrypted code string portions having almost a regular pattern and the encrypted code string portions are combined. In the present invention, a file combined from unencrypted code string portions and encrypted code string portions is also considered as a high-quality file.

Figure 32:
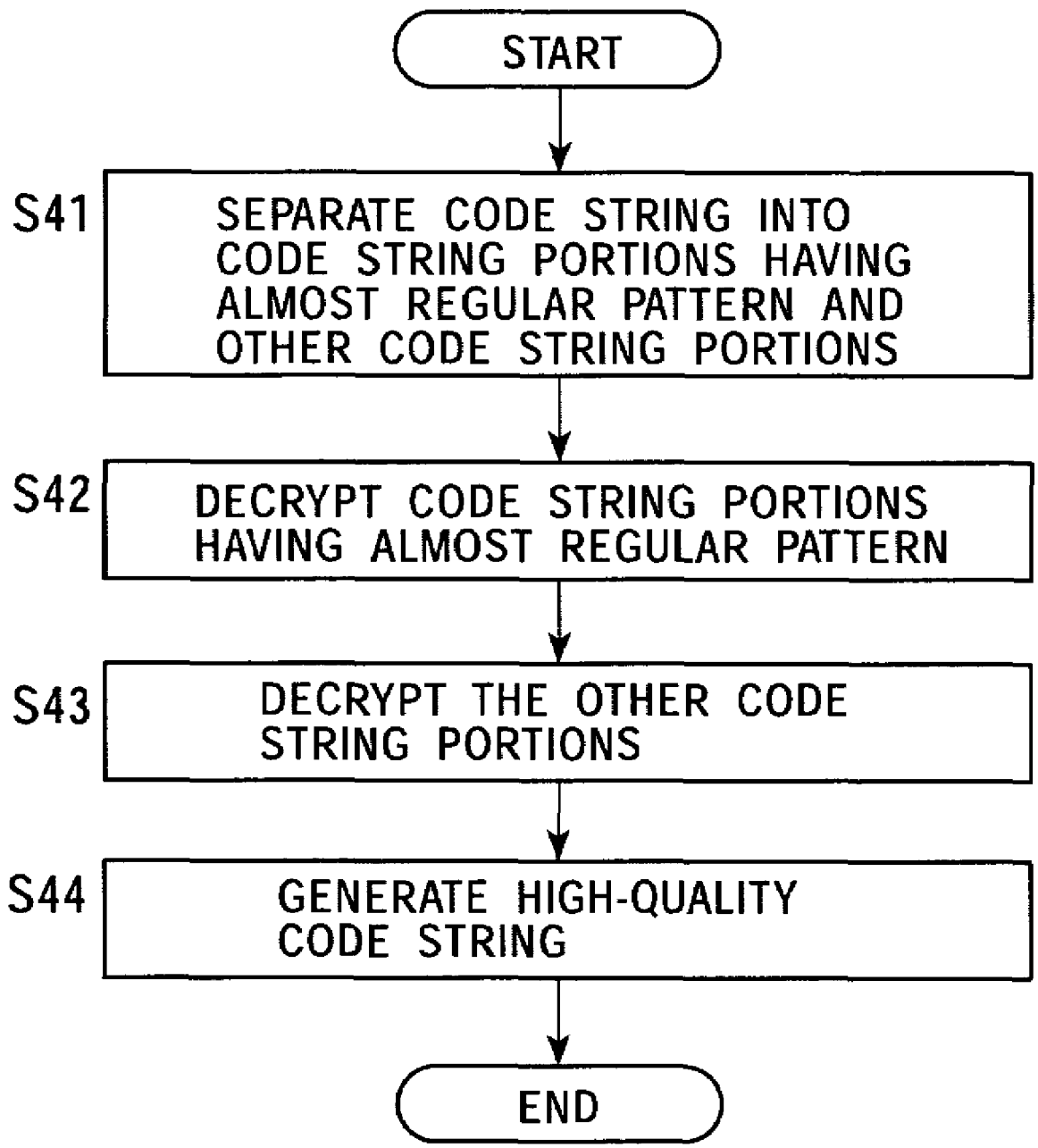
FIG. 32 is a flowchart illustrating signal processing for generating a code string achieving a high-quality playback operation from a preview file and an encrypted high-quality file.

FIG. 32 is a flowchart illustrating a method for generating a code string, which can be played back with high quality, from a preview file and an encrypted high-quality file. In step S41, encrypted code string portions having almost a regular pattern and other encrypted codes string portions are separated from an encrypted high-quality file. Then, in step S42, the code string portions having almost a regular pattern are decrypted, and in step S43, the other code string portions are decrypted. Subsequently, in step S44, a code string that can be played back with high quality can be generated from the preview file, the code string portions having almost a regular pattern decrypted in step S42, and the other code string portions decrypted in step S43. The processing is thus completed.

If the code string portions having almost a regular pattern are not encrypted, in step S41, the code string portions having almost a regular pattern and the other code string portions are separated, and step S42 is omitted. Then, in step S44, a code string that can be played back with high quality is generated from the preview file, the code string portions having almost a regular pattern, and the other code string portions decrypted in step S43. The key required for decrypting the code string can be received from the server according to a method similar to the above-described method.

The method for coding and encrypting the number of coding units and the intermediate-spectrum coefficient has been described. This method is also applicable to the method proposed in Japanese Patent Application No. 2002-160996 (which was not published when the present invention was filed) by the present inventors. In this method, in some frames, a first signal indicating an original music signal and a second signal indicating a message, such as "this is a preview signal", are superimposed and coded. If the user desires to purchase the music signal, the frames in which the first and second signals are superimposed are replaced by a code string indicating only the first signal.

Figure 33:
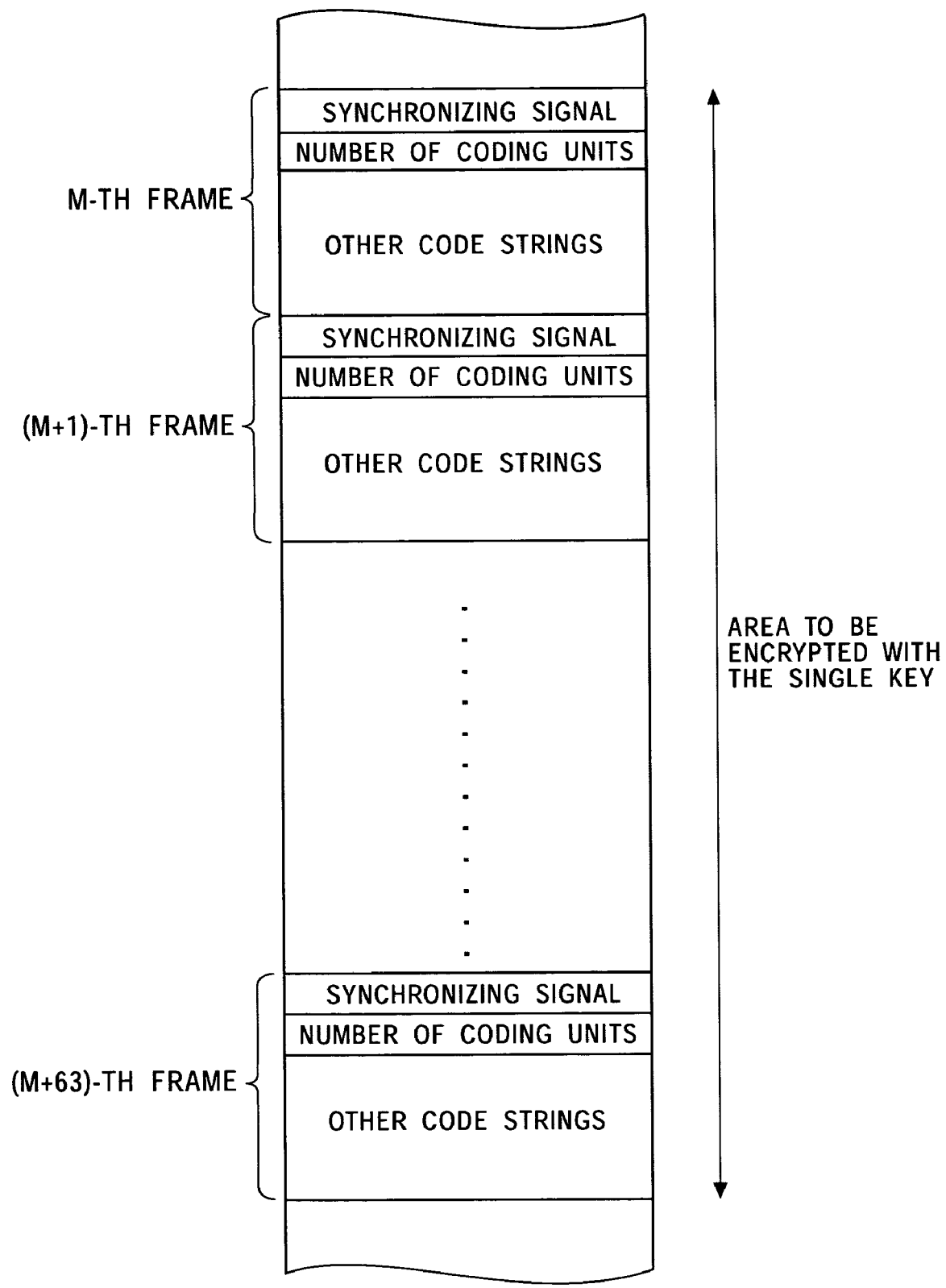
FIG. 33 illustrates an example of the format implemented by a coding method.

FIG. 33 illustrates an example of the format implemented by the method proposed in Japanese Patent Application No. 2002-160996. As discussed above, if a code having a regular pattern, such as a synchronizing signal, or a code having almost a regular pattern, such as the number of coding units, is contained in a code string, the possibility of such a code string being deciphered becomes high.

Figure 34:
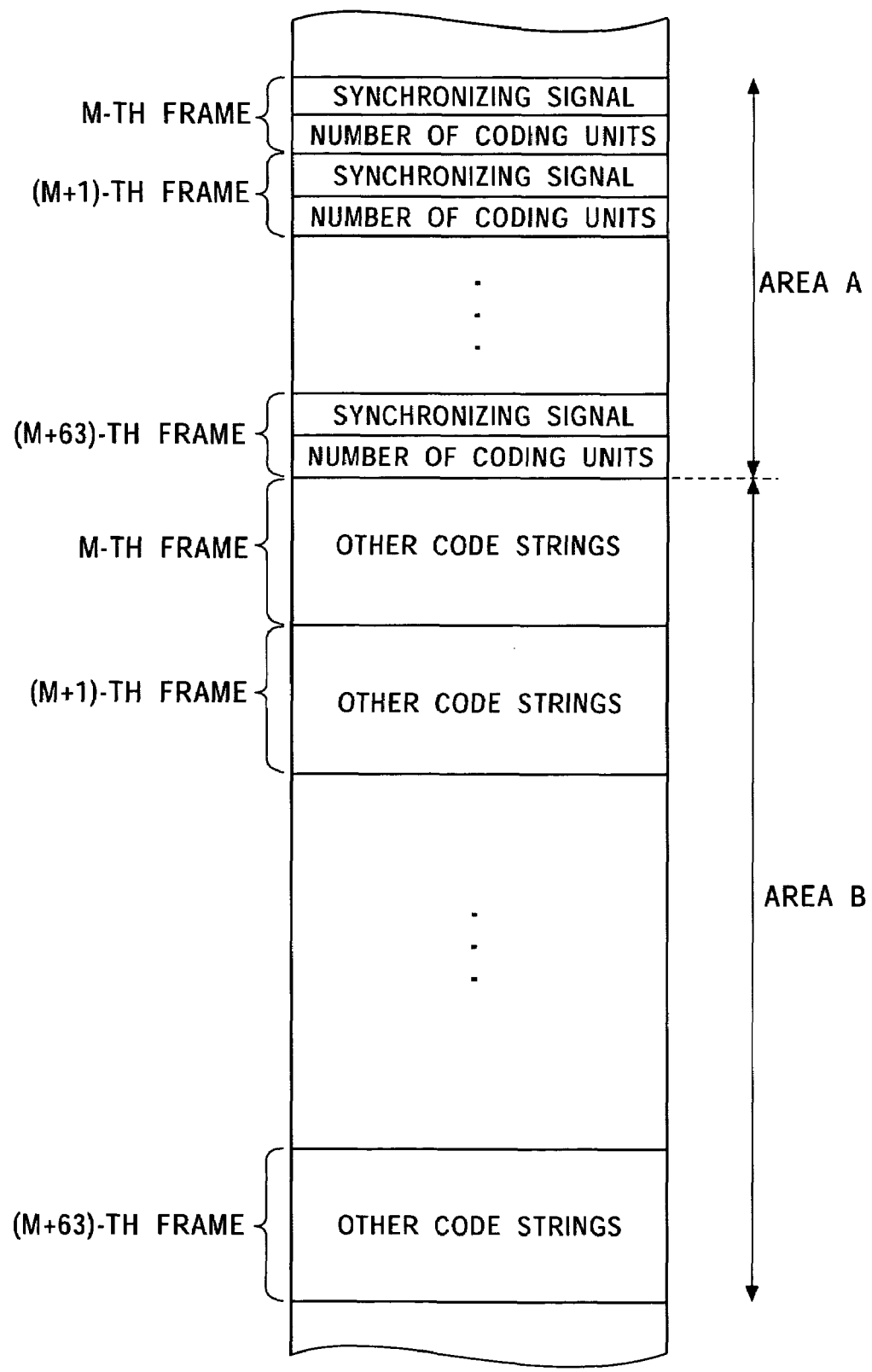
FIG. 34 illustrates another example of the format implemented by another coding method.

FIG. 34 illustrates an example of the format implemented by the method of the present invention to overcome the above-described drawback. Code string portions having an exactly or almost regular pattern are disposed together in area A, and other code string portions are disposed together in area B. The code string portions in the area B are encrypted with a key used specifically for the area B. The code string portions in the area A are encrypted separately from the area B with a key different from the key used for the area B. Alternatively, the code string portions in the area A are not encrypted. With this method, since the code strings without a regular pattern in the area B are encrypted, the possibility of such code strings being deciphered becomes low, thereby increasing the security.

Figure 35:
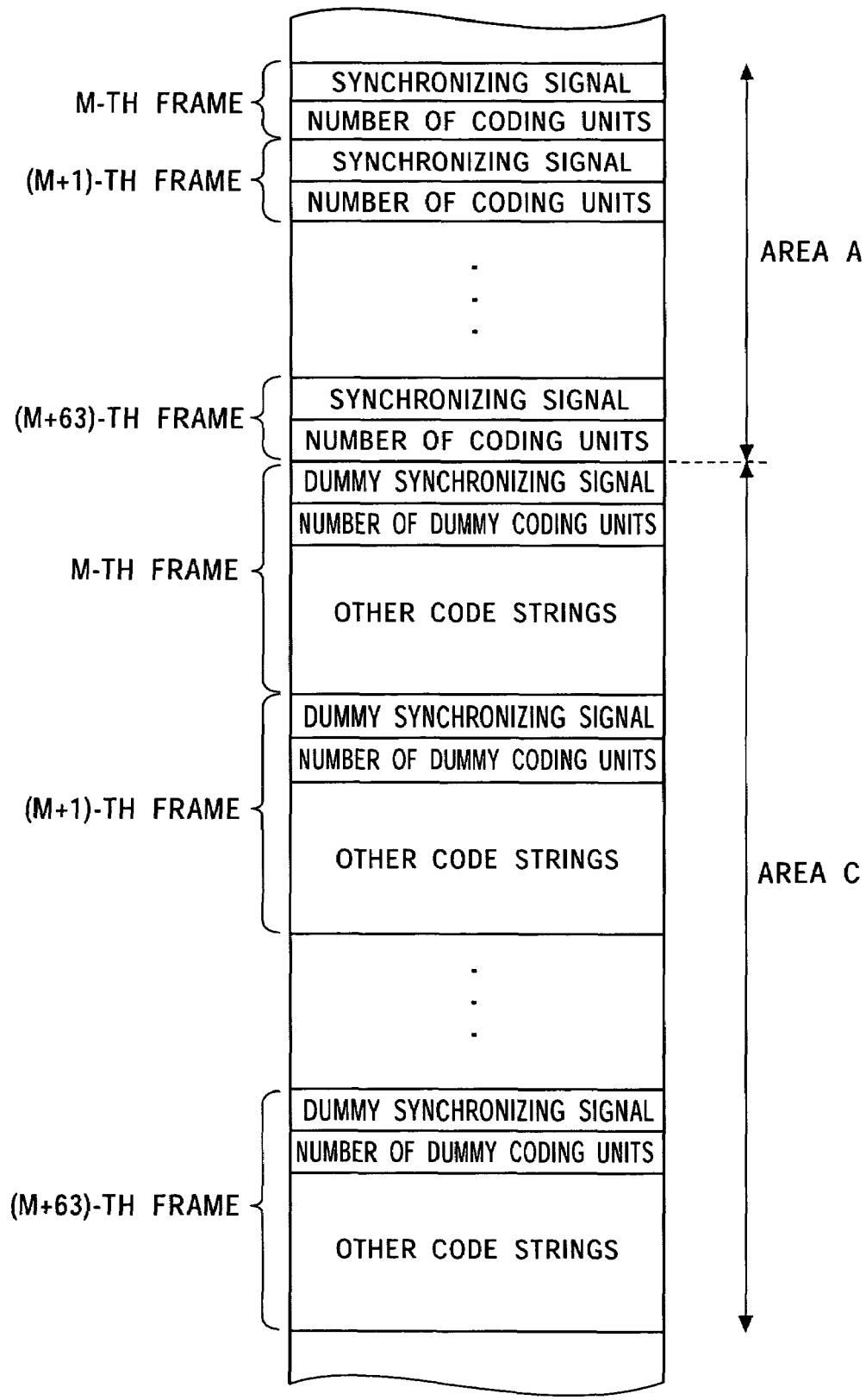
FIG. 35 illustrates still another example of the format implemented by another coding method.

FIG. 35 illustrates an example of the format implemented by another method of the present invention to reduce the possibility of code strings being deciphered. In this method, an original code string is decomposed into code string portions having an exactly or almost regular pattern in area A and code string portions in which code string portions having an exactly or almost regular pattern are replaced by dummy data. As the dummy data, a random number generated by a suitable method is used. In the method shown in FIG. 35, the code string portions in area C are encrypted with a key used specifically for area C, and the code string portions in area A are encrypted with a key different from the key used for area C. Alternatively, the code string portions in the area A are not encrypted. With this method, since the code strings without a regular pattern in the area C are encrypted, the possibility of such code strings being deciphered becomes low, thereby increasing the security.

The method of the present invention has been described as an encryption method for a high-quality file that achieves a high-quality playback operation from a preview file. The method of the present invention is also applicable to an encryption method for a music-code-string file itself. That is, an entire music code string may be encrypted with a format such as that shown in FIG. 34 or 35. Also in this case, since the code strings without a regular pattern are encrypted in area B or C, the possibility of such code strings being deciphered becomes low, thereby increasing the security. That is, the method of the present invention is effectively employed when a code string encrypted as described above is recorded in a recording medium, and the key for the code string is sold to decrypt the code string.

Although audio signals are employed in the above-described embodiment, the present invention can be used for image signals. For example, when an image signal is coded with MPEG-1, the start code of the picture layer is fixed. If a code string containing such a start code is encrypted, it may be deciphered based on the start code of the picture layer for a reason similar to that described above. The method of the present invention can also be effectively employed in such a case.

The method of the present invention is also effective not only when recording code strings, but also when transmitting code strings. The present invention is applicable to, for example, audio signals to be broadcasted. In this case, the security of code strings that achieve high-quality playback from code strings of a preview signal can be enhanced, and the security of the preview signal can also be enhanced.

In the description of the present invention, code strings encrypted with different methods include code strings encrypted with different keys.

What is claimed is:

1. A code-string generating method comprising:
   a generation step of generating a first code string and a second code string from at least part of an original code string obtained by coding a signal, the first code string containing a code string having a low playback quality and the second code string being used for increasing the quality of a playback signal of the first code string; and
   an encryption step of encrypting the second code string, wherein, in said encryption step, a first portion of the second code string having an exact or almost regular pattern is encrypted by a first encryption process, or the first portion is not encrypted, and a second portion, which is part of the second code string other than the first portion, is encrypted by a second encryption process different from the first encryption process, and wherein part of or all of the first portion is embedded at a position in the first code string which is ignored when the first code string is played back.

2. A code-string generating method according to claim 1, wherein the first portion of the second code string includes at least one of playback band information and synchronizing signal information.

3. A code-sting generating method according to claim 1, wherein said generation step includes a replacement step of replacing part of the original code sting by dummy data, and the first code string contains the dummy data and the original code which is not replaced by the dummy data, and the second code sting contains part of or all of true data of the original code sting which is replaced by the dummy data.

4. A code-sting generating method according to claim 3, wherein part of or all of the true data of the original code string, which is different from the true data contained in the second code sting, is contained at a position in the first code string and that is different from the dummy data.

5. A code-string generating apparatus comprising:
   generation means for generating a first code string and a second code string from at least part of an original code string obtained by coding a signal, the first code string containing a code string having a low playback quality and the second code string being used for increasing the quality of a playback signal of the first code string; and encryption means for encrypting the second code string, wherein, in said encryption means, a first portion of the second code string having an exact or almost regular pattern is encrypted by a first encryption process, or the first portion is not encrypted, and a second portion, which is Part of the second code string other than the first portion, is encrypted by a second encryption process different from the first encryption process, and wherein part of or all of the first portion is embedded at a position in the first code string which is ignored when the first code string is played back.

6. A code-sting generating apparatus according to claim 5, wherein the first portion of the second code sting includes at lest one of playback band information and synchronizing signal information.

7. A code-string generating apparatus according to claim 5, wherein said generation means includes replacement means for replacing part of the original code string by dummy data, and the first code string contains the dummy data and the original code which is not replaced by the dummy data, and the second code string contains part of or all of true data of the original code string which is replaced by the dummy data.

8. A code-string generating apparatus according to claim 7, wherein part of or all of the true data of the original code string, which is different from the true data contained in the second code string, is contained at a position in the first code string and that is different from the dummy data.

9. A code-string decrypting method comprising:
a first decryption step of decrypting by a first decryption process, or not decrypting, a first encrypted code string corresponding to a first portion of a code string which has an exactly or almost regular pattern before being encrypted; and
a second decryption step of decrypting a second encrypted code string corresponding to a second portion, which is part of the code string other than the first portion, by a second decryption process different from the first decryption process.

10. A code-string decrypting method according to claim 9, wherein the first encrypted code string and the second encrypted code string are used for increasing the quality of a playback signal of a third code string containing a code string having a low playback quality, and the first and second encrypted code strings and the third code string are generated by performing predetermined processing on at least part of an original code string obtained by coding a signal.

11. A code-string decrypting method according to claim 9, wherein the first portion includes at least one of playback band information and synchronizing signal information.

12. A code-string decrypting method according to claim 9, wherein the first portion is embedded at a position in the third code string which is ignored when the first code string is played back.

13. A code-string decrypting method according to claim 9, further comprising a rearrangement step of rearranging the first encrypted code string and the second encrypted code string according to a predetermined technique before said first and second decryption steps.

14. A code-string decrypting apparatus comprising:
first decryption means for decrypting by a first decryption process, or for not decrypting, a first encrypted code string corresponding to a first portion of a code string which has an exactly or almost regular pattern before being encrypted; and
second decryption means for decrypting a second encrypted code string corresponding to a second portion, which is part of the code string other than the first portion, by a second decryption process different from the first decryption process.

15. A code-string decrypting apparatus according to claim 14, wherein the first encrypted code string and the second encrypted code string are used for increasing the quality of a playback signal of a third code string containing a code string having a low playback quality, and the first and second encrypted code strings and the third code string are generated by performing predetermined processing on at least part of an original code string obtained by coding a signal.

16. A code-string decrypting apparatus according to claim 14, wherein the first portion includes at least one of playback band information and synchronizing signal information.

17. A code-string decrypting apparatus according to claim 14, wherein the first portion is embedded at a position in the third code string which is ignored when the first code string is played back.

18. A code-string decrypting apparatus according to claim 14, wherein the first encrypted code string and the second encrypted code string are rearranged according to a predetermined technique before being input into said first and second decryption means.

19. A code-string encrypting method comprising the steps of:
separating a code string into a first code-string portion having an exactly or almost regular pattern and a second code-string portion other than the first code-string portion; and
encrypting, or not encrypting, the first code-string portion by a first process, and encrypting the second code-string portion by a second process different from the first process.

20. A code-string encrypting apparatus comprising means for separating a code string into a first code-string portion having an exactly or almost regular pattern and a second code-string portion other than the first code-string portion, and for encrypting, or not encrypting, the first code-string portion by a first process, and encrypting the second code-string portion by a second process different from the first process.

21. A recording medium comprising:
a first code-string portion having an exactly or almost regular pattern encrypted or not encrypted by a first process; and
a second code-string portion other than the first code-string portion encrypted by a second process different from the first process.

* * * * *

UNITED STATES PATENT AND TRADEMARK OFFICE
CERTIFICATE OF CORRECTION

PATENT NO.       : 7,266,700 B2                                     Page 1 of 1
APPLICATION NO.  : 10/648092
DATED            : September 4, 2007
INVENTOR(S)      : Kyoya Tsutsui et al.

It is certified that error appears in the above-identified patent and that said Letters Patent is hereby corrected as shown below:

In claim 1, column 24, line 29, "method comprising:" should read --method, comprising:--.

In claim 3, column 24, line 51, "code-sting" should read --code-string--.

In claim 3, column 24, line 53, "sting" should read --string--.

In claim 3, column 24, line 56, "sting" should read --string--.

In claim 3, column 24, line 57, "sting" should read --string--.

In claim 4, column 24, line 58, "code-sting" should read --code-string--.

In claim 4, column 24, line 61, "sting," should read --string,--.

In claim 5, column 24, line 63, "apparatus comprising:" should read --apparatus, comprising:--.

In claim 5, column 25, line 8, "Part" should read --part--.

In claim 6, column 25, line 14, "code-sting" should read --code-string--.

In claim 6, column 25, line 15, "sting" should read --string--.

Signed and Sealed this

Eighteenth Day of December, 2007

JON W. DUDAS
*Director of the United States Patent and Trademark Office*